United States Patent
Yan et al.

(10) Patent No.: US 8,946,355 B2
(45) Date of Patent: *Feb. 3, 2015

(54) HYDROXYARYL FUNCTIONALIZED POLYMERS

(75) Inventors: Yuan-Yong Yan, Copley, OH (US); Zengquan Qin, Copley, OH (US); Xiao-Dong Pan, Akron, OH (US)

(73) Assignee: Bridgestone Corporation, Tokyo (JP)

(*) Notice: Subject to any disclaimer, the term of this patent is extended or adjusted under 35 U.S.C. 154(b) by 472 days.

This patent is subject to a terminal disclaimer.

(21) Appl. No.: 13/381,331

(22) PCT Filed: Jun. 30, 2010

(86) PCT No.: PCT/US2010/040669
§ 371 (c)(1),
(2), (4) Date: Feb. 8, 2012

(87) PCT Pub. No.: WO2011/002930
PCT Pub. Date: Jan. 6, 2011

(65) Prior Publication Data
US 2012/0136113 A1 May 31, 2012

Related U.S. Application Data

(60) Provisional application No. 61/221,595, filed on Jun. 30, 2009, provisional application No. 61/221,604, filed on Jun. 30, 2009.

(51) Int. Cl.
*C08F 236/10* (2006.01)
*C08L 15/00* (2006.01)
*C08L 7/00* (2006.01)
*C08F 2/38* (2006.01)
*C08C 19/44* (2006.01)

(52) U.S. Cl.
CPC . *C08F 2/38* (2013.01); *C08C 19/44* (2013.01); *C08F 236/10* (2013.01); *C08L 15/00* (2013.01); *C08L 7/00* (2013.01)
USPC .......................... 525/374; 525/333.6; 525/342

(58) Field of Classification Search
CPC ......... C08C 19/44; C08F 2/38; C08F 236/10; C08L 15/00; C08L 7/00
USPC ....................................... 525/242, 333.6, 374
See application file for complete search history.

(56) References Cited

U.S. PATENT DOCUMENTS

| | | | |
|---|---|---|---|
| 4,172,188 A | 10/1979 | Balle et al. | |
| 4,499,243 A | 2/1985 | Rader | |
| 4,791,174 A | 12/1988 | Bronstert et al. | |
| 4,816,520 A | 3/1989 | Bronstert | |
| 4,835,209 A | 5/1989 | Kitagawa et al. | |
| 4,935,471 A | 6/1990 | Halasa et al. | |
| 5,066,729 A * | 11/1991 | Stayer et al. | 525/315 |
| 5,153,159 A | 10/1992 | Antkowiak et al. | |
| 5,153,271 A * | 10/1992 | Lawson et al. | 525/332.8 |
| 5,227,431 A | 7/1993 | Lawson et al. | |
| 5,248,722 A | 9/1993 | DeTrano et al. | |
| 5,254,628 A | 10/1993 | Lawson et al. | |
| 5,268,413 A | 12/1993 | Antkowiak et al. | |
| 5,310,798 A | 5/1994 | Lawson et al. | |
| 5,354,822 A | 10/1994 | Antkowiak et al. | |
| 5,698,646 A | 12/1997 | Kitamura et al. | |
| 5,880,206 A | 3/1999 | Nakamura et al. | |
| 6,242,522 B1 | 6/2001 | Ezawa et al. | |
| 6,369,167 B1 | 4/2002 | Morita et al. | |
| 6,977,281 B1 * | 12/2005 | Ozawa et al. | 525/377 |
| 7,056,985 B2 | 6/2006 | Faust et al. | |
| 7,208,171 B2 | 4/2007 | Messersmith et al. | |
| 7,241,839 B2 | 7/2007 | Krom et al. | |
| 7,820,765 B2 | 10/2010 | Yan | |
| 8,183,326 B2 | 5/2012 | Yan et al. | |
| 8,389,644 B2 | 3/2013 | Brumbaugh et al. | |
| 8,735,494 B2 | 5/2014 | Luo et al. | |
| 8,765,888 B2 | 7/2014 | Qin et al. | |
| 2005/0201974 A1 | 9/2005 | Schestopol et al. | |

(Continued)

FOREIGN PATENT DOCUMENTS

| | | | |
|---|---|---|---|
| EP | 0442068 A2 | 12/1990 | |
| EP | 0455191 A2 | 4/1991 | |

OTHER PUBLICATIONS

Kocienski Protecting Groups 2000.*
Official action from JPO in JP appl. No. 2012-518602, mailed Sep. 2, 2014—2 pages plus 3-page translation.
R.P. Quirk et al., "Anionic synthesis of chain-end functionalized polymers using 1,1-diphenylethylene derivatives. Preparation of 4-hydroxyphenyl-terminated polystyrenes," Makromol. Chem., vol. 190, pp. 487-493 (1989).

(Continued)

*Primary Examiner* — Mark Kaucher
(74) *Attorney, Agent, or Firm* — Meredith E. Hooker; David G. Burleson

(57) ABSTRACT

A functionalized polymer includes the reaction product of a reactive polymer and a compound that includes an aryl group having at least one directly bonded $OG_p$ substituent, where $G_p$ is a protecting group, and a substituent (Q) which is free of active hydrogen atoms and which is, or connects to the aryl group through, a moiety that includes a carbon-to-nitrogen multiple bond. The polymer can be provided from a solution that includes one or more types of ethylenically unsaturated monomers which include at least one type of polyene, particularly one or more conjugated dienes in certain embodiments. An active terminus of the resulting reactive polymer can react with the Q substituent of the compound so as to provide a polymer having as a terminal functionality the radical of a compound that includes an aryl group having at least one directly bonded $OG_p$ substituent.

20 Claims, No Drawings

(56) References Cited

U.S. PATENT DOCUMENTS

| | | | |
|---|---|---|---|
| 2005/0288398 | A1 | 12/2005 | Messersmith et al. |
| 2008/0103252 | A1* | 5/2008 | Brumbaugh et al. .......... 524/612 |
| 2010/0286348 | A1* | 11/2010 | Pan et al. ..................... 526/84 |
| 2012/0296041 | A1 | 11/2012 | Luo |
| 2013/0035437 | A1 | 2/2013 | Pan et al. |

OTHER PUBLICATIONS

R. Quirk et al., "Recent Advances in the Anionic Synthesis of Chain-End Functionalized Polymers," Macromol. Symp., 2003, 195, pp. 69-74 (Wiley-VCH Verlag GmbH & KGaA; Weinheim, Germany).

M. Yu et al., "Role of L-3,4-Dihydroxyphenylalanine in Mussel Adhesive Proteins," J. Am. Chem. Soc., vol. 121, pp. 5825-5826 (1999; American Chemical Society; Washington, DC).

D. Enders et al., "Enantioselective Synthesis of α-Substituted Primary Amines by Nucleophilic Addition to Aldehyde-SAMP Hydrazones," Angew. Chem. Int. Ed. Engl., vol. 25, No. 12, pp. 1109-1110 (1986; VCH Verlagsgesellschaft mbH; Wernheim, Germany).

A. Harada et al., "Polymerization of Azabutadiene (Azine) Derivatives. Preparation of a Stereoregular Polymer from Prionaldehyde Azine," Macromolecules, vol. 24, pp. 5504-5507 (1991; American Chemical Society; Washington, DC).

D. Enders et al., "Asymmetric synthesis of amines by nucleophilic 1,2-addition of organometallic reagents to the CN-double bond," Tetrahedron: Asymmetry, vol. 9, No. 12, pp. 1895-1946 (1997; Elsevier Science Ltd.; Great Britain).

A. Hashidzume et al., "Preparation and Polymerization of Benzaldehyde Formaldehyde Azine (1-Phenyl-2,3-diaza-1,2-butadiene)," Macromolecules, vol. 33, pp. 2397-2402 (2000; American Chemical Society; Washington, DC).

G.K. Friestad, "Chiral N-Acylhydrazones: Versatile Imino Acceptors for Axymmetric Amine Synthesis," Eur. J. Org. Chem., pp. 3157-3172 (2005; Wiley-VCH Verlag GmbH & Co. KGaA; Wernheim, Germany).

\* cited by examiner

HYDROXYARYL FUNCTIONALIZED POLYMERS

CROSS-REFERENCE TO RELATED APPLICATIONS

This is a national stage filing under 35 U.S.C. §371 of international appli-cation no. PCT/US2010/040669, filed 30 Jun. 2010, which claimed priority to and the benefit of U.S. provisional patent appl. nos. 61/221,595 and 61/221,604, both filed 30 Jun. 2009.

BACKGROUND INFORMATION

Good traction and resistance to abrasion are primary considerations for tire treads; however, motor vehicle fuel efficiency concerns argue for a minimization in their rolling resistance, which correlates with a reduction in hysteresis and heat build-up during operation of the tire. These considerations are, to a great extent, competing and somewhat contradictory: treads made from compositions designed to provide good road traction usually exhibit increased rolling resistance and vice versa. Tread compositions typically contain one or more elastomers and one or more types of reinforcing materials such as particulate carbon black and silica; see, e.g., *The Vanderbilt Rubber Handbook,* 13th ed. (1990), pp. 603-04.

Filler(s), polymer(s), and additives typically are chosen so as to provide an acceptable compromise or balance of the desired properties. Many of the polymers used in the manufacture of vulcanizates such as, e.g., tire components, are elastomeric. In addition to natural rubber, some of the most commonly employed include high-cis polybutadiene, often made by processes employing catalysts, and substantially random styrene/butadiene inter-polymers, often made by processes employing anionic initiators.

Ensuring that reinforcing filler(s) are well dispersed throughout the elastomeric material(s) both enhances processability and acts to improve physical properties. Dispersion of filler particles can be improved by increasing their interaction with the elastomer(s) and/or decreasing their interaction with each other. Examples of efforts of this type include high temperature mixing in the presence of selectively reactive promoters, surface oxidation of compounding materials, surface grafting, and chemically modifying the polymer, typically at a terminus thereof. Terminal chemical modification often occurs by reaction of a terminally active polymer with a functional terminating agent. However, chemical modifications that can be undertaken with carbanionic polymers often do not work for polymers made via Ziegler-Natta catalytic processes and, at least to some extent, vice versa.

SUMMARY

In a first aspect, a functionalized polymer includes the reaction product of a reactive polymer and a compound that includes an aryl group having at least one directly bonded $OG_p$ substituent, where $G_p$ is a protecting group, and a substituent which is free of active hydrogen atoms and which is, or connects to the aryl group through, a moiety that includes a carbon-to-nitrogen multiple bond (e.g., —C≡N or —C=N—). Using a phenyl group as an exemplary aryl group, the compound can have the general formula

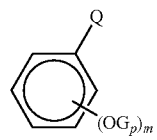

(I)

where $G_p$ is defined as above; m is an integer of from 1 to 5 inclusive; and Q is the substituent that is free of active hydrogen atoms and that is, or connects through, a moiety that includes a carbon-to-nitrogen multiple bond.

In another aspect is provided a process for providing a functionalized polymer in which a reactive polymer is reacted with a compound of the type described in the preceding paragraph. In a solution that includes an initiating compound (carbanionic) or a catalyst composition (coordination) and one or more types of ethylenically unsaturated monomers which include at least one type of polyene, the initiating compound or catalyst composition is allowed to, respectively, anionically initiate or catalyze polymerization of the monomers so as to provide, respectively, a carbanionic or pseudo-living polymer. An active terminus of the resulting polymer can react with the Q substituent of the compound so as to provide a polymer having as a terminal functionality the radical of a compound that includes an aryl group having at least one directly bonded $OG_p$ substituent.

The manner in which the terminal functionality and polymer are connected depends on the identity of the Q group. By way of non-limiting example, a formula I-type compound where Q is a nitrile group can provide a polymer of the general formula

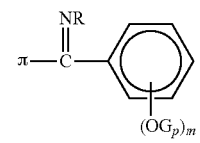

(II)

where $G_p$ and m are defined as above, R is a H atom or a group (e.g., OH, alkyl, etc.) that results from processing of the polymer, and π is a polymer chain, typically a polymer chain that includes mer derived from one or more types of polyenes. At least for those polymers made via anionic initiation techniques, the polymer chain optionally can include mer derived from at least one type of vinyl aromatic.

In any of the foregoing aspects, the protecting group(s) can be replaced, typically via hydrolysis, with hydrogen atoms so as to provide one or more hydroxyl substituents directly bonded to the aryl group. Where the aryl group is a phenyl group, this can result in from 1 to 5 hydroxyl substituents being directly bonded to the phenyl group. (The number of hydroxyl substituents can be greater than 5 where the aryl group is other than a phenyl group.)

The terminally active polymer can be provided by polymerizing ethylenically unsaturated monomers, which typically include one or more types of polyenes, particularly conjugated dienes. In certain embodiments, at least one type of vinyl aromatic compound also can be involved in the polymerization. In these and/or other embodiments, the polymer can be substantially linear and/or can include unsaturation within and/or pendent from the polymer chain as a result of polyene mer units being incorporated, preferably substantially randomly, into the polymer chain.

Regardless of how characterized, the polymer can interact with particulate filler such as, e.g., carbon black and silica. Compositions, including vulcanizates, that include particulate fillers and such polymers also are provided, as are methods of providing and using such compositions.

In any or each of these aspects, the polymer can include directly bonded aromatic pendent groups, can be substantially linear, and/or can include unsaturation within and/or pendent from the polymer chain. This unsaturation can result from incorporation of polyene mer units and preferably is substantially random along the polymer chain.

Other aspects of the present invention will be apparent to the ordinarily skilled artisan from the description that follows. To assist in understanding that description, certain definitions are provided immediately below, and these are intended to apply throughout unless the surrounding text explicitly indicates a contrary intention:

"polymer" means the polymerization product of one or more monomers and is inclusive of homo-, co-, ter-, tetra-polymers, etc.;

"mer" or "mer unit" means that portion of a polymer derived from a single reactant molecule (e.g., ethylene mer has the general formula —$CH_2CH_2$—);

"copolymer" means a polymer that includes mer units derived from two reactants, typically monomers, and is inclusive of random, block, segmented, graft, etc., copolymers;

"interpolymer" means a polymer that includes mer units derived from at least two reactants, typically monomers, and is inclusive of copolymers, terpolymers, tetrapolymers, and the like;

"random interpolymer" means an interpolymer having mer units derived from each type of constituent monomer incorporated in an essentially non-repeating manner and being substantially free of blocks, i.e., segments of three or more of the same mer;

"reactive polymer" means a polymer which, because of the presence of an active site that is associated catalyst or initiator, readily reacts with other molecules, with the term being inclusive of inter alia pseudo-living and carbanionic polymers;

"polyene" means a molecule with at least two double bonds located in the longest portion or chain thereof, and specifically is inclusive of dienes, trienes, and the like;

"polydiene" means a polymer that includes mer units from one or more dienes;

"phr" means parts by weight (pbw) per 100 pbw rubber;

"catalyst composition" is a general term encompasses a simple mixture of ingredients, a complex of various ingredients that is caused by physical or chemical forces of attraction, a chemical reaction product of some or all of the ingredients, or a combination of the foregoing, the result of which is a composition displaying catalytic activity with respect to one or more monomers of the appropriate type;

"gum Mooney viscosity" is the Mooney viscosity of an uncured polymer prior to addition of any filler(s);

"compound Mooney viscosity" is the Mooney viscosity of a composition that includes, inter alia, an uncured or partially cured polymer and particulate filler(s);

"non-coordinating anion" means a sterically bulky anion that does not form coordinate bonds with the active center of a catalyst system due to steric hindrance;

"non-coordinating anion precursor" means a compound that is able to form a non-coordinating anion under reaction conditions;

"carbanionic" and "living" are used interchangeably;

"substituted" means one containing a heteroatom or functionality (e.g., hydrocarbyl group) that does not interfere with the intended purpose of the group in question;

"oxime" means a >C=N—O— group or a compound including such a group;

"imine" means a >C=N—R' group (where R' is a hydrocarbyl group) or a compound including such a group;

"arylimine" means an imine where R' is an aryl moiety;

"azine" means a >C=N—N=C< group or a compound including such a group;

"hydrazone" means a >C=N—N< group or a compound including such a group;

"directly bonded" means covalently attached with no intervening or interposed atoms or groups;

"radical" means that portion of a molecule which remains after reacting with another molecule, regardless of whether any atoms are gained or lost as a result of the reaction;

"protecting group" means a group that (1) is sufficiently reactive toward the oxygen atom of a hydroxyl functionality that, under a first set of reaction conditions, it can replace the H atom of that group, (2) is non-reactive toward carbanionic polymers and the initiators used to provide them, and, optionally, (3) can be replaced by a H atom under a second set of reaction conditions which differ from the first set;

"terminus" means an end of a polymeric chain;

"terminally active polymer" means a reactive polymer where the active site(s) is or are at a terminus; and "terminal moiety" means a group or functionality located at a terminus.

All values herein in the form of percentages are weight percentages unless the surrounding text explicitly indicates a contrary intention.

DESCRIPTION OF ILLUSTRATIVE EMBODIMENTS

Functionalized polymers of the type described in the preceding Summary, which can be characterized or defined in a variety of ways, generally are provided by introducing a formula I-type compound into a system that includes one or more types of reactive polymers.

One of more of the polymers of the composition can be elastomeric and can include mer units that include unsaturation such as those derived from polyenes, particularly dienes and trienes (e.g., myrcene). Illustrative polyenes include $C_4$-$C_{12}$ dienes, particularly conjugated dienes such as, but not limited to, 1,3-butadiene, isoprene, 1,3-pentadiene, 2,3-dimethyl-1,3-butadiene, and 1,3-hexadiene.

Polyenes can incorporate into polymeric chains in more than one way. Especially for rubber compositions intended for tire tread applications, controlling this manner of polyene incorporation can be desirable. A polymer chain with an overall 1,2-microstructure, given as a numerical percentage based on total polyene content, of from ~10 to ~80%, or from ~25 to ~65%, can be desirable for certain end use applications. Substantially linear polymers are those that, based on total polyene content, have an overall 1,2-microstructure of no more than ~50%, preferably no more than ~45%, more preferably no more than ~40%, even more preferably no more than ~35%, and most preferably no more than ~30%. (The amount of 1,2-microstructure can be determined by, for example, proton NMR.) For certain end use applications, keeping the content of 1,2-linkages even lower, e.g., to less than ~7%, less than 5%, less than 2%, or less than 1%, can be desirable; polymers that include polyene (particularly conjugated diene) mer incorporated primarily in a high cis-1,4-linkage manner (e.g., at least ~60%, at least ~75%, at least ~90%, and even at least ~95%) can be difficult or inefficient to achieve via anionic polymerization techniques and, instead, often are prepared by processes using catalysts as opposed to the initiators employed in anionic polymerizations. Both techniques are discussed in detail below.

Depending on the intended end use, one or more of the polymer chains can include pendent aromatic groups, which can be provided, e.g., through incorporation of mer units derived from vinyl aromatics, particularly the $C_8$-$C_{20}$ vinyl aromatics such as, e.g., styrene, α-methyl styrene, p-methyl styrene, the vinyl toluenes, and the vinyl naphthalenes. When used in conjunction with one or more polyenes, mer units with pendent aromaticity can constitute up to ~60%, from ~1 to ~50%, from ~10 to ~45%, or from ~20 to ~35%, of the total number of mer units in the polymer chain. The microstructure of such interpolymers can be random, which means that mer derived from each type of constituent monomer generally do not form blocks and, instead, are incorporated in a substantially non-repeating manner. Random microstructure can provide particular benefit in some end use applications such as, e.g., rubber compositions used in the manufacture of tire treads.

Exemplary elastomers include interpolymers of one or more polyenes and styrene such as, e.g., poly(styrene-co-butadiene), also known as SBR.

The number average molecular weight ($M_n$) of the polymer typically is such that a quenched sample exhibits a gum Mooney viscosity ($ML_4/100°$ C.) of from ~2 to ~150, more commonly from ~2.5 to ~125, even more commonly from ~5 to ~100, and most commonly from ~10 to ~75.

Such polymers can be made by any of a variety of polymerization techniques. Solution polymerization generally affords a higher degree of control with respect to such properties as randomness, microstructure, etc., although other techniques, e.g., emulsion polymerization, also can be utilized. Useful polymerization solvents include various $C_5$-$C_{12}$ cyclic and acyclic alkanes as well as their alkylated derivatives, certain liquid aromatic compounds, and mixtures thereof; the ordinarily skilled artisan is aware of other useful solvent options and combinations.

Solution polymerizations have been performed since about the mid-20th century, so the general aspects thereof are known to the ordinarily skilled artisan; nevertheless, certain aspects are provided here for convenience of reference. The particular conditions of the solution polymerization can vary significantly depending on the nature of the polymer desired. In the discussion that follows, anionically initiated polymerizations are described first followed by a description of polymerizations employing coordination catalyst systems. After these descriptions, the functionalization and processing of polymers so made are discussed.

Anionic (living) polymerizations typically involve an initiator as opposed to a catalyst. Exemplary initiators include organolithium compounds, particularly alkyllithium compounds. Examples of organolithium initiators include N-lithio-hexamethyleneimine; n-butyllithium; tributyltin lithium; dialkylaminolithium compounds such as dimethylamino-lithium, diethylaminolithium, dipropylaminolithium, dibutylaminolithium and the like; dial-kylaminoalkyllithium compounds such as diethylaminopropyllithium; and those trialkylstanyl lithium compounds involving $C_1$-$C_{12}$, preferably $C_1$-$C_4$, alkyl groups.

Multifunctional initiators, i.e., initiators capable of forming polymers with more than one living end, also can be used. Examples of multifunctional initiators include, but are not limited to, 1,4-dilithiobutane, 1,10-dilithiodecane, 1,20-dilithioeicosane, 1,4-dilithiobenzene, 1,4-dilithionaphthalene, 1,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, and 4,4'-dilithiobiphenyl.

In addition to organolithium initiators, so-called functionalized initiators which become incorporated into the polymer chain, thus providing a functional group at the initiated end of the chain, also can be used. Examples of such materials include lithiated aryl thio-acetals (see, e.g., U.S. Pat. No. 7,153,919); the reaction products of organolithium compounds and, for example, N-containing organic compounds such as substituted aldimines, ketimines, secondary amines, etc., optionally pre-reacted with a compound such as diisopropenyl benzene (see, e.g., U.S. Pat. Nos. 5,153,159 and 5,567,815); as well as hydroxyaryl-containing initiators such as those described in WO 2009/086490.

In solution polymerizations, both randomization and vinyl content (i.e., 1,2-microstructure) can be increased by including a coordinator, usually a polar compound, in the polymerization ingredients. Up to 90 or more equivalents of coordinator can be used per equivalent of initiator, with the amount depending on, e.g., the amount of vinyl content desired, the level of non-polyene monomer(s) employed, the reaction temperature, and nature of the specific coordinator employed. Compounds useful as coordinators include organic compounds that include a heteroatom having a non-bonded pair of electrons (e.g., O or N). Examples include dialkyl ethers of mono- and oligo-alkylene glycols; crown ethers; tertiary amines such as tetramethylethylene diamine; THF; THF oligomers; linear and cyclic oligomeric oxolanyl alkanes (see, e.g., U.S. Pat. No. 4,429,091) such as 2,2-bis(2'-tetrahydrofuryl)propane, di-piperidyl ethane, hexamethylphosphoramide, N,N'-dimethylpiperazine, diazabicyclooctane, diethyl ether, tributylamine, and the like.

Although the ordinarily skilled artisan understands the conditions typically employed in anionically initiated polymerizations, a representative description is provided for the convenience of the reader. The following is based on a batch process, although extending this description to, e.g., semi-batch or continuous processes is within the capability of the ordinarily skilled artisan.

A blend of monomer(s) and solvent(s) can be charged to a suitable reaction vessel, followed by addition of a coordinator (if used) and initiator, which often are added as part of a solution or blend; alternatively, monomer(s) and coordinator can be added to the initiator. The polymerization typically is carried out under anhydrous, anaerobic conditions due primarily to the moisture and air sensitivity of most initiators and living polymers made therewith. The reactants can be heated (typically no higher than ~150° C.) and agitated.

After a desired degree of conversion has been reached, the heat source (if used) can be removed and, if the reaction vessel is to be reserved solely for polymerizations, the reaction mixture is removed to a post-polymerization vessel for functionalization and/or quenching.

Certain end use applications call for polymers that have properties that can be difficult or inefficient to achieve via anionic polymerizations. As mentioned previously, polymers that include conjugated diene mer incorporated primarily in a high cis-1,4-linkage manner can be difficult or inefficient to achieve via anionic polymerization techniques. Instead, such polymers often are prepared by processes using catalysts. Polymers prepared using coordination catalyst compositions often are considered to display pseudo-living characteristics.

Certain types of catalyst systems are known to be useful in producing very stereospecific 1,4-polydienes from conjugated diene monomers. Some catalyst systems preferentially result in cis-1,4-polydienes, while others preferentially provide trans-1,4-polydienes, and the ordinarily skilled artisan is familiar with examples of each type. The following description is based on a particular cis-specific catalyst system, although this merely is for sake of exemplification and is not considered to be limiting to the functionalizing method and compounds. Other types of catalyst systems, including those based on other types of metals (e.g., Ni, Co, Ti, etc.), also are believed to be capable of use; for additional information, the interested reader is directed to, e.g., U.S. Pat. Nos. 3,856,764, 3,910,869, 3,962,375, 5,811,499 and 6,596,825, as well as subsequent patent documents citing these.

Exemplary catalyst systems can employ lanthanide metals which are known to be useful for polymerizing conjugated diene monomers. Specifically, catalyst systems that include a lanthanide compound can be used to provide cis-1,4-polydienes from one or more types of conjugated dienes. Exemplary lanthanide catalyst compositions include (a) a lanthanide compound, an alkylating agent and a halogen-containing compound (although use of a halogen-containing compound is optional when the lanthanide compound and/or the alkylating agent contains a halogen atom); (b) a lanthanide compound and an aluminoxane; or (c) a lanthanide compound, an alkylating agent, and a non-coordinating anion or precursor thereof.

Various lanthanide compounds or mixtures thereof can be employed, with preference given to those which are soluble in aromatic, aliphatic, and/or cycloaliphatic liquids, although hydrocarbon-insoluble lanthanide compounds can be suspended in the polymerization medium. Preferred lanthanide compounds include those which include at least one Nd, La, or Sm atom or those including didymium. The lanthanide atom(s) in the lanthanide compounds can be in any of a number of oxidation states, although the +3 oxidation state is most common. Exemplary lanthanide compounds include carboxylates, organophosphates, organophosphonates, organophosphinates, xanthates, carbamates, dithiocarbamates, β-diketonates, alkoxides, aryloxides, halides, pseudo-halides, oxyhalides, etc.

Typically, the lanthanide compound is used in conjunction with one or more alkylating agents, i.e., organometallic compounds that can transfer hydrocarbyl groups to another metal. These agents typically are organometallic compounds of electropositive metals such as Groups 1, 2, and 3 metals. Exemplary alkylating agents include organo-aluminum compounds and organomagnesium compounds. The former include (1) compounds having the general formula $AlR^2_nX'_{3-n}$ where n is an integer of from 1 to 3 inclusive, each $R^2$ independently is a monovalent organic group (which may contain heteroatoms such as N, O, B, Si, S, P, and the like) connected to the Al atom via a C atom and each X' independently is a hydrogen atom, a halogen atom, a carboxylate group, an alkoxide group, or an aryloxide group; and (2) oligomeric linear or cyclic aluminoxanes, which can be made by reacting trihydrocarbylaluminum compounds with water. The latter include compounds having the general formula $MgR^3_yX'_{2-y}$ where X' is defined as above, y is an integer of from 1 to 2 inclusive, and $R^3$ is the same as $R^2$ except that each monovalent organic group is connected to the Mg atom via a C atom.

Some catalyst compositions contain compounds with one or more labile halogen atoms. Useful halogen-containing compounds include elemental halogens, mixed halogens, hydrogen halides, organic halides, inorganic halides, metallic halides, organo-metallic halides, and mixtures thereof. The halogen-containing compounds preferably are soluble in solvents such as those described above with respect to lanthanide compounds, although hydrocarbon-insoluble compounds can be suspended in the polymerization medium.

Other catalyst compositions contain a non-coordinating anion or a non-coordinating anion precursor. Exemplary non-coordinating anions include tetraarylborate anions, particularly fluorinated tetraarylborate anions, and ionic compounds containing non-coordinating anions and a countercation (e.g., triphenylcarbonium tetrakis(pentafluoro-phenyl)borate). Exemplary non-coordinating anion precursors include boron compounds that include strong electron-withdrawing groups.

Catalyst compositions of this type have very high catalytic activity for polymerizing conjugated dienes into stereospecific polydienes over a wide range of concentrations and ratios, although polymers having the most desirable properties typically are obtained from systems that employ a relatively narrow range of concentrations and ratios of ingredients. Further, the catalyst ingredients are believed to interact to form an active catalyst species, so the optimum concentration for any one ingredient can depend on the concentrations of the other ingredients. The following molar ratios are considered to be relatively exemplary for a variety of different systems based on the foregoing ingredients:

alkylating agent to lanthanide compound (alkylating agent/Ln): from ~1:1 to 200:1, preferably from ~2:1 to ~100:1, more preferably from ~5:1 to ~50:1;

halogen-containing compound to lanthanide compound (halogen atom/Ln): from ~1:2 to ~20:1, preferably from ~1:1 to ~10:1, more preferably from ~2:1 to ~6:1;

aluminoxane to lanthanide compound, specifically equivalents of aluminum atoms on the aluminoxane to equivalents of lanthanide atoms in the lanthanide compound (Al/Ln): from ~10:1 to ~50,000:1, preferably from ~50:1 to ~30,000:1, more preferably from ~75:1 to ~1,000:1; and non-coordinating anion or precursor to lanthanide compound (An/Ln): from ~1:2 to ~20:1, preferably from ~3:4 to ~10:1, more preferably from ~1:1 to ~6:1.

The molecular weight of a polydiene produced with a lanthanide-based catalyst can be controlled by adjusting the amount of catalyst and/or the amounts of co-catalyst concentrations within the catalyst system. In general, increasing the catalyst and co-catalyst concentrations reduces the molecular weight of resulting polydienes, although very low molecular weight polydienes (e.g., liquid polydienes) require extremely high catalyst concentrations which necessitates removal of catalyst residues from the polymer to avoid adverse effects such as retardation of the sulfur cure rate. Including one or more Ni-containing compounds to lanthanide-based catalyst compositions advantageously permits easy regulation of the molecular weight of the resulting polydiene without significant negative effects on catalyst activity and polymer microstructure. Various Ni-containing compounds or mixtures thereof can be employed, with preference given to those which are soluble in hydrocarbon solvents such as those set forth above.

The Ni atom in the Ni-containing compounds can be in any of a number of oxidation states, although divalent Ni compounds, where the Ni atom is in the +2 oxidation state, generally are preferred. Exemplary Ni compounds include carboxylates, organophosphates, organophosphonates, organophosphinates, xanthates, carbamates, dithiocarbamates, β-diketonates, alkoxides, aryloxides, halides, pseudo-halides, oxyhalides, organonickel compounds (i.e., compounds containing at least one C—Ni bond such as, for example, nickelocene, decamethylnickelocene, etc.), and the like.

The molar ratio of the Ni-containing compound to the lanthanide compound (Ni/Ln) generally ranges from ~1:1000 to ~1:1, preferably from ~1:200 to ~1:2, and more preferably from ~1:100 to ~1:5.

These types of catalyst compositions can be formed using any of the following methods:

(1) In situ. The catalyst ingredients are added to a solution containing monomer and solvent (or simply bulk monomer). The addition can occur in a stepwise or simultaneous manner. In the case of the latter, the alkylating agent preferably is added first followed by, in order, the lanthanide compound, the nickel-containing compound (if used), and (if used) the halogen-containing compound or the non-coordinating anion or non-coordinating anion precursor.

(2) Pre-mixed. The ingredients can be mixed outside the polymerization system, generally at a temperature of from about −20° to about 80° C., before being introduced to the conjugated diene monomer(s).

(3) Pre-formed in the presence of monomer(s). The catalyst ingredients are mixed in the presence of a small amount of conjugated diene monomer(s) at a temperature of from about −20° to ~80° C. The amount of conjugated diene monomer can range from ~1 to ~500 moles, preferably from ~5 to ~250 moles, and more preferably from ~10 to ~100 moles, per mole of the lanthanide compound. The resulting catalyst composition is added to the remainder of the conjugated diene monomer(s) to be polymerized.

(4) Two-stage procedure.
   (a) The alkylating agent is combined with the lanthanide compound in the absence of conjugated diene monomer, or in the presence of a small amount of conjugated diene monomer, at a temperature of from about −20° to ~80° C.
   (b) The foregoing mixture and the remaining components are charged in either a stepwise or simultaneous manner to the remainder of the conjugated diene monomer(s) to be polymerized.
   (The Ni-containing compound, if used, can be included in either stage.)

When a solution of one or more of the catalyst ingredients is prepared outside the polymerization system in the foregoing methods, an organic solvent or carrier is preferably employed. Useful organic solvents include those mentioned previously.

The production of cis-1,4-polydiene is accomplished by polymerizing conjugated diene monomer in the presence of a catalytically effective amount of a catalyst composition. The total catalyst concentration to be employed in the polymerization mass depends on the interplay of various factors such as the purity of the ingredients, the polymerization temperature, the polymerization rate and conversion desired, the molecular weight desired, and many other factors; accordingly, a specific total catalyst concentration cannot be definitively set forth except to say that catalytically effective amounts of the respective catalyst ingredients should be used. The amount of the lanthanide compound used generally ranges from ~0.01 to ~2 mmol, preferably from ~0.02 to ~1 mmol, and more preferably from ~0.03 to ~0.5 mmol per 100 g conjugated diene monomer. All other ingredients generally are added in amounts that are based on the amount of lanthanide compound (see the various ratios set forth previously).

Polymerization preferably is carried out in an organic solvent, i.e., as a solution or precipitation polymerization where the monomer is in a condensed phase. Useful polymerization solvents include various $C_5$-$C_{12}$ cyclic and acyclic alkanes as well as their alkylated derivatives, certain liquid aromatic compounds, and mixtures thereof; the ordinarily skilled artisan is aware of other useful solvent options and combinations. The catalyst ingredients preferably are solubilized or suspended within the organic liquid. The amount (wt. %) of monomer present in the polymerization medium at the beginning of the polymerization generally ranges from ~3 to ~80%, preferably ~5 to ~50%, and more preferably ~10% to ~30%. (Polymerization also can be carried out by means of bulk polymerization conducted either in a condensed liquid phase or in a gas phase.)

Regardless of whether a batch, continuous, or semi-continuous process is employed, the polymerization preferably is conducted with moderate to vigorous agitation under anaerobic conditions provided by an inert protective gas. The polymerization temperature may vary widely, although typically a temperature of from ~20° to ~90° C. is employed; heat can be removed by external cooling and/or cooling by evaporation of the monomer or the solvent. The polymerization pressure employed may vary widely, although typically a pressure of from about 0.1 to about 1 MPa is employed.

Resulting polydienes advantageously can have a cis-1,4-linkage content of at least ~60%, at least ~75%, at least ~90%, and even at least ~95%, and a 1,2-linkage content of less than ~7%, less than ~5%, less than ~2%, and even less than ~1%.

Where 1,3-butadiene is polymerized, the cis-1,4-polybutadiene generally has a $M_n$, as determined by GPC using polybutadiene standards, of from ~5000 to ~200,000 Daltons, from ~25,000 to ~150,000 Daltons, or from ~50,000 to ~125,000 Daltons. The polydispersity of the polymers generally ranges from ~1.5 to ~5.0, typically from ~2.0 to ~4.0.

At this point, the reaction mixture commonly is referred to as a "polymer cement" because of its relatively high concentration of polymer. Terminal functionality can be provided to the reactive polymer while it remains in the polymerization vessel or, if desired, the polymer cement can be transferred to another vessel prior to reaction.

Terminal functionality can be provided by introducing to the reactive polymer a compound that includes an aryl group having at least one directly bonded $OG_p$ substituent, where $G_p$ is defined as above, and a substituent which is free of active hydrogen atoms and which is, or connects to the aryl group through, a moiety that includes a C-to-N or N-to-N multiple bond. Using a formula I-type compound, which employs a phenyl group as an exemplary aryl group, terminal functionality of the type shown in the following general formula can be provided to the polymer:

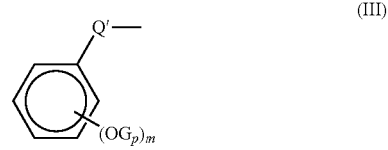

(III)

with Q' being the radical of Q (after reaction with the active sites of a reactive polymer), $G_p$ is a protecting group, and m is an integer of from 1 to 5 inclusive.

Each of formulas I-III employs a phenyl ring, which is the simplest aryl ring. This choice is made for ease of depiction and understanding and, from these, the ordinarily skilled artisan can envision numerous polycyclic aromatic compounds including, but not limited to, naphthalene, anthracene, tetracene, and the like, as well as substituted versions of each. Most of the remaining discussion focuses on those species where the aryl group is a phenyl group.

Formula I encompasses a large number of specific compounds. The paragraphs that follow discuss each of the variables utilized in that formula separately and provide certain exemplary species falling within the generic formula.

As noted previously, m can be any integer from 1 to 5 inclusive; where an aryl group other than phenyl is employed, the number of $OG_p$ functionalities can be greater than 5, although at least one always will be present. Relative to the Q substituent, a single $OG_p$ functionality can be located ortho, meta, or para on the ring to which Q is bonded or can be bonded to a C atom from another ring of the aryl group. When more than one $OG_p$ functionality is present, they can be bonded to non-adjacent or adjacent aryl C atoms; the latter constitutes one type of preferred embodiment. When three or more $OG_p$ functionalities are present, two of them can be substituents of one ring (optionally being bonded to adjacent C atoms) with the other(s) being substituent(s) of other ring(s). In one embodiment, two $OG_p$ functionalities can be at the 3 and 4 positions of the same ring within the aryl group, preferably a phenyl group. Where the aryl group is other than a phenyl group and includes more than one $OG_p$ functionality on more than one ring, at least two of the $OG_p$ functionalities preferably are at least somewhat proximate, i.e., directly bonded to ring C atoms that are separated by no more than 4, preferably 3, and even more preferably 2, other ring atoms.

The $G_p$ moieties of the $OG_p$ functionalities ensure that no active hydrogen atoms are present in the terminating compound. Although each $G_p$ moiety need not be identical, ease and simplicity typically result in a single type of $G_p$ moiety for a given compound.

Unless a particular $G_p$ constitutes a moiety that is capable of enhancing the polymer's interactivity with particulate filler (as evidenced by, for example, reduced tan δ values at 50° C.), it preferably also is capable of being hydrolyzed. Trihydrocarbylsilyl groups are a non-limiting example of the type of $G_p$ moiety that can serve these dual purposes; such moieties can be provided by reacting the hydroxyl substituent(s) of the aryl group with a trihydrocarbylsilyl halide, preferably a trialkylsilyl halide. In addition to trihydrocarbylsilyl moieties, other potentially useful $G_p$ moieties include but not limited to benzyl, t-butyl, alkoxyalkyl (e.g., $CH_3OCH_2$—), tetrahydropyranyl, allyl, sulfonamide, and bulky esters (e.g., pivalates).

The processing steps described below (including quenching) can be sufficient to hydrolyze at least some of the $G_p$ moieties, thereby providing one or more hydroxyl substituents to the terminal aryl group functionality. Alternatively, a separate reaction step designed to promote extensive, preferably complete, hydrolysis can be employed; from the exemplary technique employed in several of the examples below, the ordinarily skilled artisan can envision other potentially effective reactions. Further, the ordinarily skilled artisan understands that $OG_p$ or OH substituents may undergo further reaction during processing and/or compounding with one or more types of particulate fillers (described below).

The terminating compound reacts with the reactive polymer through Q, which is an active hydrogen-free substituent that is or that connects through a moiety which includes a C-to-N multiple bond. This can be a triple bond (i.e., a nitrile group) or a double bond, with the N atom also being bonded to a C atom or a heteroatom such as S, N, O, or P.

Non-limiting examples of useful Q substituents and the Q' moieties resulting therefrom, include but are not limited to

| Q | Resulting Q' |
|---|---|
| oximes | >CH—NH—OR, where R is defined as above |
| imines | >CH—NHR', where R' is a substituted or unsubstituted hydrocarbyl group, typically an alkyl or aryl group |
| hydrazones | >CH—NH—$R_N$, where $R_N$ is a cyclic group bonded to the N atom of the secondary amine through a ring N atom bonded to two C atoms |
| nitriles | >C=NR, where R is defined as above |
| azines | >CH—NH—N=$CR^1$ or >CH—N=$NCHR^1$, where $R^1$ is a substituted or unsubstituted hydrocarbyl group, preferably an aryl group that includes at least one $OG_p$ or OH substituent |

Specific, non-limiting examples of each of these types of compounds are provided in the examples that follow.

The terminating compound typically need not be added in significant excess, although typically a slight molar excess of the terminating compound relative to equivalents of initiating compound (for anionic polymerizations) or pseudo-living termini (in coordination catalyst polymerizations) is employed.

Quenching, if desired, can be conducted by stirring the polymer and an active hydrogen-containing compound, such as an alcohol, water or an acid, for up to about 120 minutes at temperatures of from ~25° to ~150° C.

Solvent can be removed from the (quenched) polymer cement by conventional techniques such as drum drying, extruder drying, vacuum drying or the like, which may be combined with coagulation with water, alcohol or steam and/ or thermal desolventization. If coagulation is performed, oven drying may be desirable.

Polymers such as those described above can display particularly advantageous properties when compounded with, inter alia, reinforcing fillers such as carbon black and silica. They can be utilized in a tread stock compound or can be blended with any conventionally employed tread stock rubber including natural rubber and/or non-functionalized synthetic rubbers such as, e.g., one or more of homo- and interpolymers that include just polyene-derived mer units (e.g., poly(butadiene), poly(isoprene), and copolymers incorporating butadiene, isoprene, and the like), SBR, butyl rubber, neoprene, ethylene/propylene rubber, ethylene/propylene/diene rubber, acrylonitrile/butadiene rubber, silicone rubber, fluoroelastomers, ethylene/acrylic rubber, ethylene/vinyl acetate interpolymer, epichlorohydrin rubbers, chlorinated polyethylene rubbers, chlorosulfonated polyethylene rubbers, hydrogenated nitrile rubber, tetrafluoroethylene/propylene rubber and the like. When a functionalized polymer(s) is blended with conventional rubber(s), the amounts can vary from about 5 to about 99% of the total rubber, with the conventional rubber(s) making up the balance of the total rubber. The minimum amount depends to a significant extent on the degree of hysteresis reduction desired.

Elastomeric (rubber) compounds typically are filled to a volume fraction, which is the total volume of filler(s) added divided by the total volume of the elastomeric stock, often ~25%; typical (combined) amounts of reinforcing fillers range from ~30 to ~100 phr, with the upper end of the range being defined largely by how effectively processing equipment can handle the increased viscosities imparted when such fillers are employed.

Useful fillers include various forms of carbon black including, but not limited to, furnace black, channel blacks and lamp blacks. More specifically, examples of the carbon blacks include super abrasion furnace blacks, high abrasion furnace blacks, fast extrusion furnace blacks, fine furnace blacks, intermediate super abrasion furnace blacks, semi-reinforcing furnace blacks, medium processing channel blacks, hard processing channel blacks, conducting channel blacks, and acetylene blacks; mixtures of two or more of these can be used. Carbon blacks having a surface area (EMSA) of at least 20 m$^2$/g, preferably at least ~35 m$^2$/g, are preferred; see ASTM D-1765 for methods of determining surface areas of carbon blacks. The carbon blacks may be in pelletized form or an unpelletized flocculent mass, although unpelletized carbon black can be preferred for use in certain mixers.

The amount of carbon black can be up to ~50 phr, with ~5 to ~40 phr being typical.

Amorphous silica (SiO$_2$) also can be utilized as a filler. Silicas are generally classified as wet-process, hydrated silicas because they are produced by a chemical reaction in water, from which they are precipitated as ultrafine, spherical particles. These primary particles strongly associate into aggregates, which in turn combine less strongly into agglomerates. "Highly dispersible silica" is any silica having a very substantial ability to de-agglomerate and to disperse in an elastomeric matrix, which can be observed by thin section microscopy.

Surface area gives a reliable measure of the reinforcing character of different silicas; the Brunauer, Emmet and Teller ("BET") method (described in *J. Am. Chem. Soc.*, vol. 60, p. 309 et seq.) is a recognized method for determining surface area. BET surface areas of silicas generally are less than 450 m$^2$/g, commonly from ~32 to ~400 m$^2$/g or from ~100 to ~250 m$^2$/g or from ~150 to ~220 m$^2$/g.

The pH of the silica filler (when used) is generally from about 5 to about 7 or slightly over, preferably from about 5.5 to about 6.8.

Commercially available silicas include various grades of Hi-Sil™ powdered and granular silicas (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J.M. Huber Corp. (Edison, N.J.).

When silica is employed, a coupling agent such as a silane often is added so as to ensure good mixing in, and interaction with, the elastomer(s). Generally, the amount of silane that is added ranges between ~4 and 20%, based on the weight of silica filler present in the elastomeric compound. Coupling agents can have a general formula of A-T-G, in which A represents a functional group capable of bonding physically and/or chemically with a group on the surface of the silica filler (e.g., surface silanol groups); T represents a hydrocarbon group linkage; and G represents a functional group capable of bonding with the elastomer (e.g., via a sulfur-containing linkage). Such coupling agents include organosilanes, in particular polysulfurized alkoxysilanes (see, e.g., U.S. Pat. Nos. 3,873,489, 3,978,103, 3,997,581, 4,002,594, 5,580,919, 5,583,245, 5,663,396, 5,684,171, 5,684,172, 5,696,197, etc.) or poly-organosiloxanes bearing the G and A functionalities mentioned above. Addition of a processing aid can be used to reduce the amount of silane employed. See, e.g., U.S. Pat. No. 6,525,118 for a description of fatty acid esters of sugars used as processing aids. Additional fillers useful as processing aids include, but are not limited to, mineral fillers, such as clay (hydrous aluminum silicate), talc (hydrous magnesium silicate), and mica as well as non-mineral fillers such as urea and sodium sulfate. Exemplary micas contain principally alumina, silica and potash, although other variants can be used. Additional fillers can be utilized in an amount of up to ~40 phr, typically up to ~20 phr.

Silica commonly is employed in amounts up to ~100 phr, typically in an amount from ~5 to ~80 phr. When carbon black also is present, the amount of silica can be decreased to as low as ~1 phr; as the amount of silica decreases, lesser amounts of the processing aids, plus silane if any, can be employed.

One or more non-conventional fillers having relatively high interfacial free energies, i.e., surface free energy in water values ($\gamma_{pl}$) preferably are used in conjunction with or in place of carbon black and/or silica. The term "relatively high" can be defined or characterized in a variety of ways such as, e.g., greater than that of the water-air interface, preferably several multiples (e.g., at least 2×, at least 3× or even at least 4×) of this value; at least several multiples (e.g., at least 2×, at least 4×, at least 6×, at least 8×, or even at least 10×) of the $\gamma_{pl}$ value for amorphous silica; in absolute terms such as, e.g., at least ~300, at least ~500, at least ~750, at least 1000, at least 1500, and at least 2000 mJ/m$^2$; in ranges such as, e.g., from ~400 to 5000 mJ/m$^2$, from ~450 to 4000 mJ/m$^2$, from ~500 to 5000 mJ/m$^2$, and various sub-ranges within the foregoing and/or other combinations of high and low values; and the like.

Non-limiting examples of naturally occurring materials with relatively high interfacial free energies include F-apatite, goethite, hematite, zincite, tenorite, gibbsite, quartz, kaolinite, all forms of pyrite, and the like. Certain synthetic complex oxides also can exhibit this type of high interfacial free energy.

The foregoing types of materials typically are more dense than either carbon black or amorphous silica; thus, replacing a particular mass of carbon black or silica with an equal mass of a non-conventional filler typically will result in a much smaller volume of overall filler being present in a given compound. Accordingly, replacement typically is made on an equal volume, as opposed to equal weight, basis. Generally, 5 to 60% of the conventional particulate filler material(s) can be replaced with an approximately equivalent (~0.8× to ~1.2×) volume of non-conventional filler particles; in certain embodiments, replacing ~15 to ~55% of the conventional particulate filler material(s) with an approximately equivalent (~0.9× to ~1.1×) volume of other filler particles is adequate while, in still other embodiments, replacing ~18 to ~53% of the conventional particulate filler material(s) with an approximately equivalent (~0.95× to ~1.05×) volume of other filler particles can be preferable. The weight inequality issue might be able to be overcome or ameliorated by employing non-standard particles; for example, one can envision essentially hollow particles of one or more types of non-conventional fillers as well as relatively light particles coated so as to have a surface that includes one or more of types of non-conventional filler compounds.

The non-conventional filler particles generally can be of approximately the same size as the conventional fillers employed in compounds. In general, relatively small particles are preferred both for reinforcement purposes and to ensure a large number of particles are available at the tread surface.

Other conventional rubber additives also can be added. These include, for example, process oils, plasticizers, antidegradants such as antioxidants and antiozonants, curing agents and the like.

All ingredients can be mixed with standard equipment such as, e.g., Banbury or Brabender mixers. Typically, mixing occurs in two or more stages. During the first stage (often referred to as the masterbatch), mixing typically is begun at temperatures of ~120° to ~130° C. and increases until a so-called drop temperature, typically ~165° C., is reached.

Where a formulation includes fillers other than or in addition to carbon black, a separate re-mill stage often is employed for separate addition of the silane component(s). This stage often is performed at temperatures similar to, although often slightly lower than, those employed in the masterbatch stage, i.e., ramping from ~90° C. to a drop temperature of ~150° C.

Reinforced rubber compounds conventionally are cured with about 0.2 to about 5 phr of one or more known vulcanizing agents such as, for example, sulfur or peroxide-based curing systems. For a general disclosure of suitable vulcanizing agents, the interested reader is directed to an overview such as that provided in Kirk-Othmer, *Encyclopedia of Chem. Tech.*, 3d ed., (Wiley Interscience, New York, 1982), vol. 20, pp. 365-468. Vulcanizing agents, accelerators, etc., are added at a final mixing stage. To reduce the chances of undesirable scorching and/or premature onset of vulcanization, this mixing step often is done at lower temperatures, e.g., starting at ~60°-65° C. and not going higher than ~105°-110° C.

Subsequently, the compounded mixture is processed (e.g., milled) into sheets prior to being formed into any of a variety of components and then vulcanized, which typically occurs at ~5° to ~15° C. higher than the highest temperatures employed during the mixing stages, most commonly ~170° C.

The following non-limiting, illustrative examples provide the reader with detailed conditions and materials that can be useful in the practice of the present invention.

EXAMPLES

In the examples, dried glass vessels previously sealed with extracted septum liners and perforated crown caps under a positive $N_2$ purge were used for all preparations. Butadiene (in hexane, concentrations noted in separate examples), styrene (33% by wt. in hexane unless otherwise noted), hexane, n-butyllithium (1.60 M in hexane), 2,2-bis(2'-tetrahydrofuryl)propane solution (1.6 M solution in hexane, stored over $CaH_2$), and butylated hydroxytoluene (BHT) solution in hexane were used.

Commercially available reagents and starting materials included the following (with as-purchased purities given in parentheses), which were used without further purification unless otherwise noted in a specific example:

from Sigma-Aldrich Co. (St. Louis, Mo.)—2-hydroxybenzonitrile (99%), 3-hydroxybenzonitrile (99%), 4-hydroxybenzonitrile (95%), 4-hydroxy-3-methoxybenzonitrile (98%), 4-hydroxybenzaldehyde (98%), 4-(dimethylamino)benzonitrile (98%), ethyl acetate (99.5%), 3,4-dihydroxybenzonitrile (97%), 3,5-dihydroxybenzonitrile, 2-hydroxybenzonitrile, 3-hydroxybenzonitrile, 4-hydroxybenzonitrile, 3-hydroxybenzaldehyde (97%), 4-hydroxybenzaldehyde (98%), 3,4-dihydroxybenzaldehyde (97%), 2,4,6-trihydroxybenzaldehyde (97%), 3,4,5-trihydroxybenzaldehyde monohydrate (98%), 1-aminopyrrolidine hydrochloride, 1-aminopiperidine (97%), 1-aminohomopiperidine (95%), salicylaldoxime (97%), 4-di(methylamino)pyridine (DMAP, 99%), hydrazine (98%), pyridine (99.8%), 1,3-dimethyl-2-imidazolidinone (DMI), methylene chloride (anhydrous, >99.8%), triethylamine (99%), and 4,4'-bis(diethylamino)benzophenone (DEAB, 99%);

from ACROS Organics (Geel, Belgium)—tert-butyldimethylsilyl chloride (98%) and tetrabutylammonium fluoride (TBAF, 1M in THF containing ~5% water); and from Alfa Aesar (Ward Hill, Mass.)—3,4-dihydroxybenzaldoxime (98%).

Testing data in the Examples was performed on filled compositions made according to the formulations shown in the tables below. Styrene/butadiene interpolymers were compounded according to the formulations set forth in Tables 1a-1d, while cis-1,4-polybutadienes were compounded according to the formulation set forth in Table 1e. In these tables, N-phenyl-N'-(1,3-dimethylbutyl)-p-phenyldiamine acts as an antioxidant while 2,2'-dithiobisbenzothiazole, N-t-butylbenzothiazole-2-sulfenamide, and N,N'-diphenylguanidine act as accelerators.

TABLE 1a

Composition for vulcanizates, carbon black filler

| | Amount (phr) |
|---|---|
| Masterbatch | |
| SBR interpolymer | 100 |
| carbon black (N343 type) | 50 |
| wax | 2 |
| N-phenyl-N'-(1,3-dimethylbutyl)-p-phenylenediamine | 0.95 |
| stearic acid | 2 |
| processing oil (low PCA content) | 10 |
| Final | |
| sulfur | 1.5 |
| N-cyclohexylbenzothiazole-2-sulfenamide | 0.5 |
| N,N'-diphenylguanidine | 0.3 |
| 2,2'-dithiobisbenzothiazole | 0.5 |
| ZnO | 2.5 |
| TOTAL | 170.25 |

TABLE 1b

Composition for vulcanizates, silica filler

| | Amount (phr) |
|---|---|
| Masterbatch | |
| SBR interpolymer | 80 |
| poly(isoprene) (natural rubber) | 20 |
| silica | 52.5 |
| wax | 2 |
| N-phenyl-N'-(1,3-dimethylbutyl)-p-phenyldiamine | 0.95 |
| stearic acid | 2 |
| processing oil (low PCA content) | 10 |
| Re-mill | |
| silica | 2.5 |
| silane | 5 |
| Final | |
| sulfur | 1.5 |
| ZnO | 2.5 |
| 2,2'-dithiobisbenzothiazole | 2.0 |
| N-t-butylbenzothiazole-2-sulfenamide | 0.7 |
| N,N'-diphenylguanidine | 1.4 |
| TOTAL | 183.05 |

TABLE 1c

Composition for vulcanizates, carbon black and aluminum hydroxide

| | Amount (phr) |
|---|---|
| Masterbatch | |
| SBR interpolymer | 100 |
| carbon black (N339 type) | 25 |
| Higilite ™ H-43M Al(OH)$_3$ (Showa Denko) | 33.6 |
| N-phenyl-N'-(1,3-dimethylbutyl)-p-phenylenediamine | 1.0 |
| stearic acid | 2.0 |

TABLE 1c-continued

Composition for vulcanizates, carbon black and aluminum hydroxide

| | Amount (phr) |
|---|---|
| Final | |
| sulfur | 1.5 |
| N,N'-diphenylguanidine | 0.5 |
| 2,2'-dithiobisbenzothiazole | 1.0 |
| ZnO | 3.0 |
| TOTAL | 167.6 |

TABLE 1d

Composition for vulcanizates, carbon black and titanium dioxide

| | Amount (phr) |
|---|---|
| Masterbatch | |
| SBR interpolymer | 100 |
| Tronox ™ Cr-834 alumina-stabilized TiO₂ (Kerr-McGee) | 116.7 |
| N-phenyl-N'-(1,3-dimethylbutyl)-p-phenylenediamine | 1.0 |
| stearic acid | 2.0 |
| Final | |
| sulfur | 1.3 |
| N,N'-diphenylguanidine | 0.5 |
| N-t-butylbenzothiazole-2-sulfenamide | 1.0 |
| 2,2'-dithiobisbenzothiazole | 1.0 |
| ZnO | 3.0 |
| TOTAL | 226.5 |

TABLE 1e

Composition for filled compounds, polybutadienes

| | Amount (phr) |
|---|---|
| synthesized cis-1,4-polybutadiene | 80 |
| polyisoprene | 20 |
| carbon black (N339 type) | 50 |
| naphthenic oil | 10 |
| wax | 2 |
| antioxidant | 1 |
| ZnO | 2.5 |
| stearic acid | 2 |
| accelerators | 1.3 |
| sulfur | 1.5 |
| Total | 170.3 |

Data corresponding to "Bound rubber" were determined using the procedure described by J. J. Brennan et al., *Rubber Chem. and Tech.*, 40, 817 (1967).

GPC was used to acquire % coupling data.

Cold flow testing was performed using a Scott™ plasticity tester. Samples were prepared by melt pressing 2.5 g of polymer at 100° C. for 20 minutes in a mold using a preheated press. The resulting cylindrical samples, which had a uniform thickness of ~12 mm, were allowed to cool to room temperature before being removed from the mold. Samples were placed individually under the weight of a 5 kg calibrated weight. Sample thicknesses was recorded as a function of time. Sample thickness at the conclusion of the appropriate time (~30 minutes for SBR interpolymers, ~8 minutes for polybutadienes) generally is considered to be an acceptable indicator of cold flow resistance.

Data corresponding to "Dynastat tan δ" were acquired from tests conducted on a Dynastat™ mechanical spectrometer (Dynastatics Instruments Corp.; Albany, N.Y.) using the following conditions: 1 Hz (10 Hz for polybutadienes), 2 kg static mass and 1.25 kg dynamic load, a cylindrical (9.5 mm diameter×16 mm height) vulcanized rubber sample, and the noted temperature.

Compound Mooney viscosity ($ML_{1+4}$) values were determined at the noted temperatures with an Alpha Technologies™ Mooney viscometer (large rotor) using a one-minute warm-up time and a four-minute running time. The "$t_{50}$" and "$t_{90}$" values are the times needed to reach viscosities that are, respectively, 50% and 90% greater than minimum, while a "$t_5$" value represents the time required to raise the viscosity five Mooney units above the minimum viscosity.

Tensile mechanical properties were determined using the standard procedure described in ASTM-D412; Payne effect (ΔG', i.e., the difference between G' at low and high strain values) and hysteresis (tan δ) data were obtained from dynamic experiments conducted at 2% strain and 10 Hz (temperature sweep) and the following conditions for strain sweep:

SBR interpolymers: 60° C. and 10 Hz, from 0.25% to 24% strain, and polybutadienes: 50° C. and 15 Hz, from 0.1% to 20% strain.

With respect to tensile properties, $M_X$ is modulus at X % elongation, $T_b$ is tensile strength at break, and $E_b$ is percent elongation at break.

Examples 1-9

Synthesis of Benzonitriles

To a dry flask under nitrogen was charged ~5.0 g 3-hydroxybenzonitrile, ~0.3 g DMAP, ~20 mL triethylamine, and ~80 mL THF. A solution of ~46 mL tert-butyldimethylsilyl chloride (1.0 M in $CH_2Cl_2$) then was added slowly via syringe. The reaction mixture was stirred for ~1 hour at room temperature. Solid was filtered and the filtrate evaporated. The residue was purified by silica gel column chromatography (200-425 mesh from Fisher Scientific) with hexane/ethyl acetate (95:5, v/v) as eluent. Approximately 9.3 g (95% yield) of a colorless oil product was recovered. Proton and $^{13}C$ NMR spectroscopic analysis (Varian™300 MHz spectrophotometer) confirmed the product as 3-(tert-butyldimethylsilyloxy) benzonitrile [3-(TBDMSO)BN, Example 1].

Similar procedures were used to make 2 (tert-butyldimethylsilyloxy)benzonitrile [2-(TBDMSO)BN, Example 2] (94%, colorless oil) and 4-(tert-butyldimethylsiloxyl)benzonitrile [4-(TBDMSO)BN, Example 3] (95%, white solid).

To a dry flask under $N_2$ was charged ~5.7 g 3,4-dihydroxybenzonitrile, ~9.4 g triethylamine, and ~60 mL DMF. After the solution was cooled to 0°C., a solution of ~14.0 g tert-butyldimethylsilyl chloride in 40 mL DMF was added dropwise. The reaction mixture was stirred for ~3 hours at room temperature before being poured into ~150 mL hexane and ~50 mL saturated $NH_4Cl$ solution. The organic phase was washed with three 50 mL portions of water before being dried with anhydrous $MgSO_4$. After removing solvent, the residue was separated in a flash silica gel column with hexane/ethyl acetate (95:5, v/v) as eluent, yielding ~15.0 g of a pale yellow oil (97.5%). Proton and $^{13}C$ NMR spectroscopic analysis confirmed the product as 3,4-bis(tert-butyldimethylsilyloxy) benzonitrile (BTBDMSBN, Example 4).

To a dry flask under $N_2$ was charged ~7.0 g 3,4-dihydroxybenzonitrile and ~0.25 g DMAP; ~150 mL methylene chloride was added to give a suspension. To this was added ~15.9 mL triethylamine, resulting in a colorless solution, followed by ~14.5 mL chlorotrimethylsilane (dropwise). This mixture was stirred at room temperature for ~2 hours before removal of all volatiles under reduced pressure followed by addition of ~200 mL dry hexane. The final solution was filtered to another dry flask where all solvent was removed, resulting in a pale pink oil (92.7% yield). Proton and $^{13}$C NMR spectroscopic analysis con-firmed the product as 3,4-bis(trimethylsilyloxy)benzonitrile (3,4-TMSO-BN, Example 5).

Similar synthetic procedures were used to produce four other benzonitriles, the structures of which were confirmed by $^1$H and $^{13}$C NMR:

Example 6—3,5-bis(trimethylsilyloxy)benzonitrile (3,5-TMSO-BN), colorless oil (92.0% yield), Example 7—2-trimethylsilyloxybenzonitrile (2-TMSO-BN), red oil (90.7% yield), Example 8—3-trimethylsilyloxybenzonitrile (3-TMSO-BN), red oil (94.3% yield), and Example 9—4-trimethylsilyloxybenzonitrile (4-TMSO-BN), pale yellow oil (92.6% yield).

Examples 10-13

Synthesis of Benzaldehydes

To a dry flask under nitrogen was charged ~8.5 g 4-hydroxybenzaldehyde, ~0.4 g DMAP, 20 mL triethylamine and 100 mL THF. A solution of ~11.6 g tert-butyldimethylsilyl chloride in 30 mL THF was added slowly via syringe. The reaction mixture was stirred for ~1 hour at room temperature. Solid was filtered and the filtrate evaporated. The residue was purified by silica gel column chromatography with hexane/ethyl acetate (90:10, v/v) as eluent. Approximately 16.3 g (98% yield) of a colorless oil product was recovered. Proton and $^{13}$C NMR spectroscopic analysis confirmed the product as 4 (tert-butyldimethylsilyloxy)benzaldehyde [4-(TBDMSO)BA, Example 10].

Similar procedures were used to make 2-(tert-butyldimethylsilyloxy)benzaldehyde [2-(TBDMSO)BA, Example 11] and 3 (tert-butyldimethylsilyloxy)benzaldehyde [3-(TBDMSO)BA, Example 12].

To a dry flask fitted with a magnetic stirring bar was introduced ~8.3 g 3,4-dihydroxybenzaldehyde, ~0.5 g DMAP, 30 mL triethylamine, and 100 mL THF. A solution of ~19.0 g tert-butyldimethylsilyl chloride in 50 mL THF was added slowly via syringe. The reaction mixture was stirred for ~1 hour at room temperature. Solid was filtered and the filtrate evaporated. The residue was purified by silica gel column chromatography with hexane/ ethyl acetate (90:10, v/v) as eluent. Approximately 21.3 g (96.8% yield) of a colorless oily, waxy product was obtained. Proton and $^{13}$C NMR spectroscopic analysis confirmed the product as 3,4-bis(tert-butyldimethylsilyloxy)benzaldehyde [3,4-(TBDMSO)BA, Example 13].

Examples 14-17

Synthesis of Piperidine Hydrazones

At room temperature, ~7.1 g 4-(TBDMSO)BA (from Example 5) and ~3.6 mL 1-aminopiperidine in 40 mL CH$_2$Cl$_2$ (40 mL) were stirred for ~12 hours. Solvent was removed by rotary evaporation and the residue purified by silica gel column chromatography with hexane/ethyl acetate (94:6, v/v) as eluent. Approximately 8.5 g (89% yield) of a white solid was obtained. Proton and $^{13}$C NMR spectroscopic analysis confirmed the product as 4 (tert-butyldimethylsilyloxy)benzaldehyde piperidine hydrazone [4-(TBDMSO) BAPH, Example 14].

Similar procedures were used to make 2-(tert-butyldimethylsilyloxy)benzaldehyde piperidine hydrazone [2-(TBDMSO)BAPH, Example 15] (90% yield, white solid), 3 (tert-butyldimethylsilyloxy)benzaldehyde piperidine hydrazone [3-(TBDMSO)BAPH, Example 16] (90% yield, white solid), and 3,4-bis(tert-butyldimethylsilyloxy)benzaldehyde piperidine hydrazone [3,4-(TBDMSO)BAPH, Example 17] (91% yield, oily product).

Examples 18-19

Synthesis of Protected Oximes

To a dry flask fitted with a magnetic stirring bar was introduced ~4.6 g 3,4-dihydroxybenzaldoxime, ~0.4 g DMAP, 10 mL triethylamine, and 50 mL THF. A solution of ~14.3g tert-butyldimethylsilyl chloride in 30 mL THF was added slowly via syringe. The reaction mixture was stirred for ~1 hour at room temperature. Solid was filtered and the filtrate evaporated. The residue was purified by silica gel column chromatography with hexane/ethyl acetate (95:5, v/v) as eluent. Approximately 13.4 g (90% yield) of an oily product was obtained. Proton and $^{13}$C NMR spectroscopic analysis confirmed the product as 3,4-bis(tert-butyldimethylsilyloxy)benzaldoxime-tert-butyldimethylsilyloxy [3,4-(TBDMSO)B0x-(TBDMS0), Example 18].

A similar procedure was used to make 2-(tert-butyldimethylsilyloxy)-benzaldoxime-tert-butyldimethylsilyloxy [2-(TBDMSO)BOx(TBDMSO), Example 19] (94% yield, colorless oily product).

Examples 20-22

Synthesis of Protected Azines

At room temperature, ~18.3 g 3,4-(TBDMSO)BA (from Example 13) and ~0.78 g hydrazine in 40 mL CH$_2$Cl$_2$ were stirred for ~12 hours. Solvent was removed under rotary evaporation and the residue was purified by silica gel column chromatography with hexane/ethyl acetate (95:5, v/v). Approximately 15.5 g (85% yield) of a yellow solid was obtained. Proton and $^{13}$C NMR spectroscopic analysis confirmed the product as 3,4-bis(tert-butyldimethylsilyloxy)benzaldehyde azine [3,4-(TBDMSO)Az, Example 20].

Similar procedures were used to make 3 (tert-butyldimethylsilyloxy)benzaldehyde azine [3-(TBDMSO)Az, Example 21] (yellow solid) and 4-(tert-butyldimethylsilyloxy)-benzaldehyde piperidine azine [4-(TBDMSO)Az, Example 22] (yellow solid).

Examples 23-29

Synthesis of Imines

Under nitrogen, to a solution of ~5.0 g 3,4-bis(tert-butyldimethylsilyloxy)benzaldehyde in 20 mL hexane was added 4 g anhydrous sodium sulfate followed by ~1.12 mL propylamine. The mixture was stirred overnight at room temperature. After removing salt and solvent, a yellow oil was obtained (92.8% yield). Proton and $^{13}$C NMR spectroscopic analysis confirmed the product as N-[3,4-bis(tert-butyldimethylsilyloxy)benzylidene]propylamine[3,4-(BTBSO) PhCH=NPr, Example 23].

Similar procedures were used to make N-[3,5-bis(tert-butyldimethylsilyloxy)benzylidene]propylamine[3,5-(BT-BSO)PhCH=NPr, Example 24], N-[2,4-bis(tert-butyldimethylsilyloxy)benzylidene]propylamine [2,4-(BTBSO)PhCH=NPr, Example 25], N-[2,3-bis(tert-butyldimethylsilyloxy)benzylidene]propylamine [2,3-(BTBSO)PhCH=NPr, Example 26], N-[2,5-bis(tert-butyldimethylsilyloxy)benzylidene]propylamine [2,5-(BTBSO)-PhCH=NPr, Example 27], N-[2,4,5-tris(tert-butyldimethylsilyloxy)benzylidene]propylamine [2,4,5-(TTBSO)PhCH=NPr, Example 28], and N-[3,4,5-tris(tert-butyldimethylsilyloxy)benzylidene]propylamine [3,4,5-(TTBSO)PhCH=NPr, Example 29].

Examples 30-35

Styrene/Butadiene Copolymers Functionalized with Hydroxyaryl Nitriles

To a $N_2$-purged reactor equipped with a stirrer was added 1.55 kg hexane, 0.41 kg styrene solution, and 2.52 kg butadiene solution (21.6% by wt. in hexane). The reactor was charged with 3.40 mL n-butyllithium solution, followed by 1.10 mL 2,2-bis(2'-tetrahydrofuryl)propane solution. The reactor jacket was heated to 50° C. and, after ~32 minutes, the batch temperature peaked at ~63.0° C. After an additional ~30 minutes, the polymer cement was transferred to glass bottles.

One sample was quenched with isopropanol before being agitated at 50° C. for ~30 minutes. This control sample is designated as Example 30 below.

To another sample was added a 1.0 M solution of 4-(TBDMSO)BA (Example 5) in hexane, controlling the amount of benzaldehyde so that, relative to amount of butyl-lithium initiator, the molar ratio was ~1:1. This sample also was agitated at 50° C. for ~30 minutes before TBAF solution was added (~6:5 molar ratio relative to initiator) to hydrolyze the protecting groups; the sample was agitated for another ~2 hours at room temperature. This comparative sample is designated as Example 31 below.

To three additional samples were added 1.0 M solutions in hexane of, respectively, Example 32—2-(TBDMSO)BN (from Example 2),
Example 33—3-(TBDMSO)BN (from Example 1), and
Example 34—4-(TBDMSO)BN (from Example 3),
all at a molar ratio of ~1:1 relative to amount of initiator. These samples were agitated at 50° C. for ~30 minutes before TBAF solution was added (~6:5 molar ratio relative to initiator); each sample was agitated for another ~2 hours at room temperature.

The foregoing polymerization was essentially repeated, using the following amounts of reactants and additives:

| | |
|---|---|
| hexane | 1.64 kg |
| styrene solution | 0.41 kg |
| butadiene solution (22.4%) | 2.43 kg |
| n-butyllithium | 3.10 mL |
| 2,2-bis(2'-tetrahydrofuryl)propane solution | 1.10 mL |

The batch temperature peaked at ~61.2° C. After an additional ~30 minutes, 5.3 mL of a 1.0 M solution of 4-(dimethylamino)benzonitrile in toluene was added to a portion of the polymer cement, and this mixture was agitated at 50° C. for another ~30 minutes. This comparative sample is designated as Example 35 below.

Examples 30-35 were quenched in isopropanol containing BHT and then drum dried. Properties of these polymers are summarized below in Table 2, with $M_p$ representing peak molecular weight; molecular weights were determined by GPC using SBR standards. Cold flow testing results are summarized in Table 3.

TABLE 2

| Polymer properties | | | | | | |
|---|---|---|---|---|---|---|
| | 30 | 31 | 32 | 33 | 34 | 35 |
| $M_n$ (kg/mol) | 118 | 118 | 139 | 131 | 133 | 148 |
| $M_w/M_n$ | 1.04 | 1.04 | 1.14 | 1.13 | 1.20 | 1.17 |
| $M_p$ (kg/mol) | 122 | 122 | 122 | 122 | 122 | 137 |
| $T_g$ (° C.) | −36.5 | −36.5 | −37.1 | −37.3 | −36.7 | −35.5 |
| coupling (%) | 0 | 0 | 31.8 | 19.0 | 24.4 | 22.9 |

TABLE 3

| Cold flow testing of polymers (height in mm) | | | | | | |
|---|---|---|---|---|---|---|
| Time (sec) | 30 | 31 | 32 | 33 | 34 | 35 |
| 0 | 10.627 | 10.217 | 10.044 | 10.782 | 10.760 | 9.828 |
| 10 | 8.425 | 9.037 | 9.011 | 9.667 | 9.789 | 8.873 |
| 20 | 7.456 | 8.328 | 8.374 | 9.160 | 9.351 | 8.309 |
| 30 | 6.744 | 7.759 | 7.870 | 8.768 | 9.011 | 7.858 |
| 40 | 6.223 | 7.288 | 7.453 | 8.437 | 8.731 | 7.476 |
| 50 | 5.825 | 6.891 | 7.106 | 8.157 | 8.488 | 7.148 |
| 60 | 5.518 | 6.558 | 6.813 | 7.907 | 8.277 | 6.863 |
| 70 | 5.269 | 6.273 | 6.563 | 7.691 | 8.087 | 6.615 |
| 80 | 5.060 | 6.033 | 6.352 | 7.493 | 7.918 | 6.395 |
| 90 | 4.889 | 5.828 | 6.163 | 7.316 | 7.763 | 6.205 |
| 100 | 4.735 | 5.648 | 5.996 | 7.160 | 7.621 | 6.031 |
| 120 | 4.488 | 5.350 | 5.721 | 6.882 | 7.371 | 5.744 |
| 140 | 4.292 | 5.107 | 5.495 | 6.648 | 7.152 | 5.507 |
| 160 | 4.128 | 4.907 | 5.300 | 6.450 | 6.963 | 5.314 |
| 180 | 3.994 | 4.734 | 5.138 | 6.273 | 6.794 | 5.144 |
| 200 | 3.876 | 4.588 | 4.998 | 6.120 | 6.639 | 4.999 |
| 230 | 3.728 | 4.403 | 4.817 | 5.922 | 6.440 | 4.814 |
| 260 | 3.602 | 4.244 | 4.665 | 5.749 | 6.269 | 4.660 |
| 290 | 3.495 | 4.114 | 4.531 | 5.603 | 6.115 | 4.526 |
| 320 | 3.404 | 3.997 | 4.419 | 5.474 | 5.984 | 4.408 |
| 360 | 3.296 | 3.865 | 4.283 | 5.321 | 5.825 | 4.277 |
| 400 | 3.204 | 3.752 | 4.168 | 5.193 | 5.688 | 4.160 |
| 450 | 3.105 | 3.630 | 4.042 | 5.050 | 5.541 | 4.037 |
| 500 | 3.021 | 3.526 | 3.935 | 4.927 | 5.414 | 3.930 |
| 600 | 2.880 | 3.351 | 3.756 | 4.724 | 5.196 | 3.754 |
| 700 | 2.766 | 3.216 | 3.613 | 4.561 | 5.024 | 3.611 |
| 800 | 2.674 | 3.102 | 3.493 | 4.424 | 4.878 | 3.495 |
| 900 | 2.594 | 3.006 | 3.393 | 4.311 | 4.756 | 3.397 |
| 1000 | 2.527 | 2.924 | 3.307 | 4.215 | 4.649 | 3.310 |
| 1100 | 2.467 | 2.856 | 3.228 | 4.124 | 4.559 | 3.239 |
| 1200 | 2.411 | 2.791 | 3.162 | 4.050 | 4.475 | 3.169 |
| 1300 | 2.366 | 2.734 | 3.101 | 3.978 | 4.401 | 3.108 |
| 1400 | 2.319 | 2.679 | 3.044 | 3.916 | 4.335 | 3.058 |
| 1500 | 2.280 | 2.635 | 2.995 | 3.858 | 4.274 | 3.006 |
| 1600 | 2.245 | 2.593 | 2.946 | 3.808 | 4.220 | 2.961 |
| 1700 | 2.209 | 2.552 | 2.903 | 3.757 | 4.164 | 2.919 |
| 1800 | 2.178 | 2.514 | 2.862 | 3.713 | 4.118 | 2.880 |

Examples 36-41

Preparation and Testing of Vulcanizates

Using the formulation from Table 1a above, vulcanizable elastomeric compounds containing reinforcing fillers were prepared from Examples 30-35. Compounds were cured for ~15 minutes at 171° C. to provide vulcanizates 36-41, respectively.

Results of physical testing on vulcanizates made from these polymers are summarized below in Table 4; for the "Temp. sweep" section, the top rows of data are from measurements at 0° C. while the bottom rows are from measurements at 60° C.

Example 4) in hexane, controlling the amount of nitrile so that its molar ratio, relative to amount of butyllithium initiator, was ~1:1. The latter sample was agitated at 50° C. for ~30

TABLE 4

Compound and vulcanizate properties, Examples 36-41

|  | 36 | 37 | 38 | 39 | 40 | 41 |
|---|---|---|---|---|---|---|
| synthetic polymer (example no.) | 30 | 31 | 32 | 33 | 34 | 35 |
| Bound rubber (%) | 2.5 | 10.3 | 15.9 | 29.2 | 22.9 | 25.5 |
| MDR2000 @ 171° C. (final) |  |  |  |  |  |  |
| ML (kg · cm) | 0.78 | 0.84 | 1.39 | 1.32 | 1.39 | 0.96 |
| MH (kg · cm) | 16.11 | 17.48 | 16.92 | 16.13 | 15.78 | 14.79 |
| $t_{90}$ (min) | 6.47 | 7.70 | 6.02 | 6.28 | 7.06 | 6.96 |
| $ML_{1+4}$ @ 100° C. (final) | 21.7 | 24.8 | 43.5 | 43.1 | 44.7 | 31.7 |
| Dynatstat ™ tan δ @ 60° C. (final) | 0.2262 | 0.1989 | 0.1143 | 0.0989 | 0.1057 | 0.1340 |
| Tensile @ 23° C. (final, unaged) |  |  |  |  |  |  |
| $M_{50}$ (MPa) | 1.74 | 1.89 | 1.75 | 1.63 | 1.62 | 1.58 |
| $M_{300}$ (MPa) | 11.22 | 13.03 | 14.65 | 16.41 | 16.59 | 13.39 |
| $T_b$ (MPa) | 12.2 | 15.6 | 17.7 | 15.6 | 18.6 | 16.6 |
| $E_b$ (%) | 321 | 355 | 351 | 289 | 328 | 356 |
| Tensile @ 100° C. (final, unaged) |  |  |  |  |  |  |
| $M_{50}$ (MPa) | 1.25 | 1.37 | 1.47 | 1.42 | 1.32 | 1.22 |
| $M_{200}$ (MPa) | 5.43 | 6.42 | 7.50 | 8.38 | 7.74 | 6.44 |
| $T_b$ (MPa) | 7.7 | 8.2 | 9.7 | 9.3 | 9.2 | 7.4 |
| $E_b$ (%) | 266 | 245 | 241 | 214 | 225 | 220 |
| Strain sweep (60° C., 10 Hz, final) |  |  |  |  |  |  |
| G' @ 5% strain (MPa) | 2.877 | 2.691 | 2.102 | 1.924 | 2.025 | 2.002 |
| G" @ 5% strain (MPa) | 0.740 | 0.613 | 0.254 | 0.199 | 0.238 | 0.288 |
| tan δ | 0.2573 | 0.2280 | 0.1209 | 0.1034 | 0.1177 | 0.1437 |
| ΔG' (MPa) | 4.350 | 3.167 | 0.632 | 0.369 | 0.583 | 0.751 |
| Temp. sweep (2% strain, 10 Hz, final) |  |  |  |  |  |  |
| G' (MPa) | 15.242 | 14.984 | 10.712 | 8.023 | 7.929 | 10.806 |
|  | 5.894 | 6.070 | 4.371 | 3.340 | 3.517 | 4.207 |
| G" (MPa) | 5.367 | 5.258 | 4.227 | 3.223 | 2.911 | 4.245 |
|  | 1.337 | 1.323 | 0.642 | 0.403 | 0.419 | 0.694 |
| tan δ | 0.3520 | 0.3503 | 0.3944 | 0.4017 | 0.3670 | 0.3924 |
|  | 0.2268 | 0.2179 | 0.1469 | 0.1207 | 0.1192 | 0.1649 |

The data of Table 4 indicate, inter alia, that vulcanizates employing styrene/butadiene interpolymers having terminal units derived from hydroxyaryl nitriles (Examples 38-40) exhibit excellent interaction with carbon black fillers as evidenced by significant reductions in high temperature tan δ values and ΔG' (Payne effect), increases in tan δ at 0° C. and bound rubber, etc. These polymers also exhibit better resistance to cold flow compared to control and comparative polymers.

Examples 42-46

Styrene/Butadiene Copolymers Functionalized with Polyhydroxyaryl Nitrites

To a $N_2$-purged reactor equipped with a stirrer was added 4.44 kg hexane, 1.16 kg styrene solution, and 7.06 kg butadiene solution (21.6% by wt. in hexane). The reactor was charged with 9.92 mL n-butyllithium solution, followed by 3.50 mL 2,2-bis(2'-tetrahydrofuryl)propane solution. The reactor jacket was heated to 50° C., and the polymerization was allowed to proceed for ~2 hours. After the polymer cement was cooled to room temperature, samples were transferred to glass bottles, one of which (Example 42) was terminated with isopropanol and the other (Example 43) functionalized by addition of a 1.0 M solution of BTBDMSBN (from Example 4) in hexane, controlling the amount of nitrile so that its molar ratio, relative to amount of butyllithium initiator, was ~1:1. The latter sample was agitated at 50° C. for ~30 minutes before TBAF solution was added (~11:5 molar ratio relative to nitrile) and then rotated in a 25° C. water bath for ~2 hours.

The polymer cements were coagulated with isopropanol containing BHT and drum dried. The properties of these two polymers are provided below in Table 5, where 1,2-microstructure percentages are based on total amount of butadiene employed.

TABLE 5

Properties of polymers from Examples 42-43

|  | 42 | 43 |
|---|---|---|
| $M_n$ (kg/mol) | 132 | 157 |
| $M_w/M_n$ | 1.03 | 1.21 |
| $T_g$ (° C.) | −29.0 | −29.0 |
| Total styrene (%) | 21.6 | 21.6 |
| Blocked styrene (%) | 2.7 | 2.7 |
| 1,2-microstructure (%) | 59.3 | 59.3 |
| Cold flow (mm) | 2.92 | 5.18 |

As can be seen from a comparison of the cold flow test results, a styrene/butadiene interpolymer functionalized by reaction with a polyhydroxyaryl nitrile compound exhibits significantly improved resistance to cold flow relative to an essentially identical SBR without such terminal functionalization.

The foregoing polymerization was essentially repeated, using the following amounts of reactants and additives:

| | |
|---|---|
| hexane | 1.62 kg |
| styrene solution | 0.41 kg |
| butadiene solution (22.2%) | 2.45 kg |
| n-butyllithium | 3.54 mL |
| 2,2-bis(2'-tetrahydrofuryl)propane solution | 1.25 mL |

The reactor jacket was heated to 50° C., and the polymerization was allowed to proceed for ~75 minutes. After the polymer cement was cooled to room temperature, it was dropped into isopropanol containing BHT. This control polymer is identified as Example 44 in Table 6 below.

Another similar polymerization was conducted, using the following amounts of reactants and additives:

| | |
|---|---|
| hexane | 1.45 kg |
| styrene solution | 0.37 kg |
| butadiene solution (22.2%) | 2.21 kg |
| n-butyllithium | 3.19 mL |
| 2,2-bis(2'-tetrahydrofuryl)propane solution | 1.13 mL |

The reactor jacket was heated to 50° C., and the polymerization was allowed to proceed for ~70 minutes before 14.4 mL of a 0.34 M solution of 3,4-bis(trimethylsilyloxy)benzonitrile (prepared using a procedure similar to that set forth above in Example 4) in hexane was added. This polymer cement was agitated at 50° C. for an additional ~30 minutes before being cooled to room temperature and a portion transferred to a glass bottle. To the transferred portion was added a hydrolyzing solution of 1.0 M HCl solution in isopropanol (threefold molar excess relative to moles of 3,4-bis(trimethylsilyloxy)benzonitrile), and this bottle was rotated in a 50° C. water bath for ~30 minutes; this polymer is identified as Example 46 below. This sample and the remainder were coagulated in isopropanol with BHT, with the non-hydrolyzed polymer being identified as Example 45 below.

TABLE 6

Properties of polymers from Examples 44-46

| | 44 | 45 | 46 |
|---|---|---|---|
| $M_n$ (kg/mol) | 114 | 122 | 127 |
| $M_w/M_n$ | 1.06 | 1.17 | 1.20 |
| $T_g$ (° C.) | −37.5 | −35.8 | −35.6 |
| Total styrene (%) | 21.8 | 21.6 | 21.6 |
| 1,2-microstructure (%) | 50.5 | 51.0 | 51.7 |

Examples 47-58

Preparation and Testing of Vulcanizates

Using the formulations from Tables 1a, 1b, 1c and 1d above, vulcanizable compounds containing reinforcing fillers were prepared from the polymers from Examples 44-46. Compounds were cured for ~15 minutes at 171° C. to provide vulcanizates 47-58, respectively.

Results of physical testing on the resulting vulcanizates are summarized below in Tables 7 and 8. For Temp. Sweep G' data in Table 7, the measurements for Examples 47-49 (carbon black vulcanizates) were taken at −10° C. while those for Examples 50-52 (silica vulcanizates) were taken at −11.3° C. For Strain Sweep data in Table 8, the measurements for Examples 53-55 (carbon black/Al(OH)$_3$ vulcanizates) were taken at 10.1% strain while those for Examples 56-58 (alumina stabilized TiO$_2$ vulcanizates) were taken at 6.0% strain.

Strain sweep test results for these vulcanizates are tabulated in Tables 9-12.

TABLE 7

Compound and vulcanizate properties, Examples 47-52

| | 47 | 48 | 49 | 50 | 51 | 52 |
|---|---|---|---|---|---|---|
| synthetic polymer (example no.) | 44 | 45 | 46 | 44 | 45 | 46 |
| Tensile @ 23° C. (final, unaged) | | | | | | |
| $M_{50}$ (MPa) | 1.78 | 1.70 | 1.73 | 2.15 | 1.65 | 1.71 |
| $M_{100}$ (MPa) | 3.11 | 3.06 | 3.19 | 3.90 | 3.12 | 3.32 |
| $M_{200}$ (MPa) | 7.07 | 7.52 | 7.96 | 8.39 | 7.51 | 7.86 |
| $M_{300}$ (MPa) | 11.7 | 13.1 | 13.6 | 13.6 | 13.1 | 13.6 |
| $T_b$ (MPa) | 14.6 | 17.2 | 17.3 | 15.4 | 14.5 | 14.5 |
| $E_b$ (%) | 357 | 373 | 363 | 331 | 322 | 314 |
| Strain sweep (60° C., 10 Hz, final) | | | | | | |
| G' @ 6% strain (MPa) | 2.59 | 2.03 | 2.04 | 3.96 | 3.07 | 2.95 |
| tan δ @ 6% strain (MPa) | 0.236 | 0.158 | 0.146 | 0.160 | 0.127 | 0.127 |
| Temp. sweep (2% strain, 10 Hz, final) | | | | | | |
| Temp. @ peak tan δ (° C.) | 0.79 | 0.85 | 0.86 | 0.74 | 0.76 | 0.76 |
| G' @ 0.25% strain (MPa) | 34.6 | 31.1 | 29.9 | 33.2 | 29.5 | 28.4 |

TABLE 8

Compound and vulcanizate properties, Examples 53-58

| | 53 | 54 | 55 | 56 | 57 | 58 |
|---|---|---|---|---|---|---|
| synthetic polymer (example no.) | 44 | 45 | 46 | 44 | 45 | 46 |
| Shore A hardness @ 23° C. | 58.5 | 58.6 | 57.9 | 45.7 | 50.3 | 51.1 |

TABLE 8-continued

Compound and vulcanizate properties, Examples 53-58

| | 53 | 54 | 55 | 56 | 57 | 58 |
|---|---|---|---|---|---|---|
| Rebound @ 50° C. | 50.8 | 60.8 | 60.8 | 53.0 | 61.2 | 62.4 |
| Tensile @ 23° C. (final, unaged) | | | | | | |
| $M_{50}$ (MPa) | 1.40 | 1.51 | 1.49 | 0.64 | 1.02 | 1.04 |
| $M_{100}$ (MPa) | 2.31 | 2.99 | 3.05 | 0.83 | 1.81 | 1.93 |
| $M_{200}$ (MPa) | 4.91 | 7.30 | 7.96 | 1.24 | 4.06 | 4.69 |
| $M_{300}$ (MPa) | 8.42 | 11.5 | 12.7 | 1.88 | 5.77 | 7.17 |
| $T_b$ (MPa) | 11.6 | 14.6 | 15.1 | 6.7 | 6.4 | 8.4 |
| $E_b$ (%) | 373 | 367 | 352 | 542 | 344 | 371 |
| Strain sweep (60° C., 10 Hz, final) | | | | | | |
| G' (MPa) | 2.00 | 1.74 | 1.82 | 1.30 | 1.55 | 1.37 |
| tan δ (MPa) | 0.164 | 0.091 | 0.092 | 0.129 | 0.082 | 0.064 |
| Temp. sweep (2% strain, 10 Hz, final) | | | | | | |
| Temp. @ peak tan δ (° C.) | 1.01 | 1.46 | 1.44 | 1.27 | 1.96 | 1.94 |
| G' @ −11.9° C. & 0.20% strain (MPa) | 23.8 | 12.5 | 12.4 | — | — | — |
| G' @ −12° C. & 0.20% strain (MPa) | — | — | — | 18.1 | 6.7 | 7.3 |
| G' @ −21° C. & 0.20% strain (MPa) | 108.2 | 102.3 | 98.5 | — | — | — |

TABLE 9

Results of strain sweep testing @ 60° C., Examples 47-49

| Strain | 47 | | 48 | | 49 | |
|---|---|---|---|---|---|---|
| (%) | tan δ | G' (MPa) | tan δ | G' (MPa) | tan δ | G' (MPa) |
| 0.249 | 0.1145 | 5.65 | 0.1046 | 2.82 | 0.0958 | 2.70 |
| 0.498 | 0.1441 | 5.15 | 0.1126 | 2.74 | 0.1001 | 2.66 |
| 0.746 | 0.1705 | 4.72 | 0.1227 | 2.65 | 0.1064 | 2.61 |
| 0.995 | 0.1905 | 4.37 | 0.1306 | 2.58 | 0.1121 | 2.55 |
| 1.244 | 0.2050 | 4.11 | 0.1387 | 2.53 | 0.1176 | 2.50 |
| 1.493 | 0.2154 | 3.90 | 0.1423 | 2.45 | 0.1222 | 2.45 |
| 1.742 | 0.2233 | 3.72 | 0.1465 | 2.40 | 0.1265 | 2.41 |
| 1.990 | 0.2292 | 3.57 | 0.1498 | 2.36 | 0.1299 | 2.37 |
| 2.238 | 0.2334 | 3.45 | 0.1524 | 2.32 | 0.1328 | 2.33 |
| 2.486 | 0.2365 | 3.34 | 0.1547 | 2.29 | 0.1353 | 2.30 |
| 2.735 | 0.2388 | 3.25 | 0.1562 | 2.26 | 0.1374 | 2.27 |
| 2.987 | 0.2404 | 3.17 | 0.1576 | 2.23 | 0.1391 | 2.25 |
| 3.235 | 0.2414 | 3.09 | 0.1584 | 2.21 | 0.1405 | 2.22 |
| 3.483 | 0.2419 | 3.02 | 0.1589 | 2.19 | 0.1419 | 2.20 |
| 3.731 | 0.2421 | 2.96 | 0.1592 | 2.16 | 0.1430 | 2.18 |
| 3.979 | 0.2420 | 2.91 | 0.1599 | 2.15 | 0.1435 | 2.16 |
| 4.227 | 0.2415 | 2.86 | 0.1599 | 2.13 | 0.1442 | 2.14 |
| 4.480 | 0.2410 | 2.81 | 0.1596 | 2.11 | 0.1447 | 2.13 |
| 4.976 | 0.2396 | 2.73 | 0.1597 | 2.08 | 0.1452 | 2.10 |
| 5.472 | 0.2378 | 2.66 | 0.1590 | 2.06 | 0.1455 | 2.07 |
| 5.973 | 0.2358 | 2.59 | 0.1582 | 2.03 | 0.1455 | 2.04 |
| 6.469 | 0.2336 | 2.54 | 0.1570 | 2.01 | 0.1453 | 2.02 |
| 6.966 | 0.2314 | 2.49 | 0.1562 | 2.00 | 0.1449 | 2.00 |
| 7.466 | 0.2292 | 2.44 | 0.1554 | 1.98 | 0.1445 | 1.98 |
| 7.964 | 0.2270 | 2.40 | 0.1542 | 1.96 | 0.1439 | 1.97 |
| 8.462 | 0.2247 | 2.36 | 0.1527 | 1.95 | 0.1432 | 1.95 |
| 8.962 | 0.2227 | 2.32 | 0.1520 | 1.93 | 0.1426 | 1.94 |
| 9.459 | 0.2205 | 2.29 | 0.1505 | 1.92 | 0.1419 | 1.92 |
| 9.955 | 0.2185 | 2.26 | 0.1497 | 1.91 | 0.1412 | 1.91 |
| 10.455 | 0.2165 | 2.23 | 0.1485 | 1.90 | 0.1408 | 1.89 |
| 10.951 | 0.2145 | 2.20 | 0.1477 | 1.89 | 0.1400 | 1.88 |
| 11.449 | 0.2127 | 2.18 | 0.1467 | 1.88 | 0.1393 | 1.87 |
| 11.951 | 0.2110 | 2.15 | 0.1453 | 1.87 | 0.1388 | 1.86 |
| 12.446 | 0.2091 | 2.13 | 0.1445 | 1.86 | 0.1381 | 1.85 |
| 12.943 | 0.2076 | 2.11 | 0.1439 | 1.85 | 0.1375 | 1.84 |
| 13.442 | 0.2060 | 2.09 | 0.1431 | 1.84 | 0.1370 | 1.83 |
| 13.941 | 0.2045 | 2.07 | 0.1424 | 1.83 | 0.1363 | 1.82 |
| 14.437 | 0.2031 | 2.05 | 0.1417 | 1.82 | 0.1359 | 1.81 |

TABLE 10

Results of strain sweep testing @ 60° C., Examples 50-52

| Strain | 50 | | 51 | | 52 | |
|---|---|---|---|---|---|---|
| (%) | tan δ | G' (MPa) | tan δ | G' (MPa) | tan δ | G' (MPa) |
| 0.253 | 0.0879 | 7.52 | 0.0748 | 4.74 | 0.0774 | 4.42 |
| 0.505 | 0.1048 | 6.98 | 0.0837 | 4.56 | 0.0861 | 4.26 |
| 0.757 | 0.1185 | 6.52 | 0.0929 | 4.39 | 0.0950 | 4.11 |
| 1.008 | 0.1269 | 6.19 | 0.1003 | 4.23 | 0.1020 | 3.97 |
| 1.261 | 0.1335 | 5.92 | 0.1060 | 4.10 | 0.1075 | 3.86 |
| 1.511 | 0.1382 | 5.69 | 0.1101 | 3.99 | 0.1116 | 3.76 |
| 1.760 | 0.1421 | 5.50 | 0.1135 | 3.90 | 0.1149 | 3.67 |
| 2.012 | 0.1450 | 5.34 | 0.1160 | 3.81 | 0.1175 | 3.60 |
| 2.263 | 0.1474 | 5.19 | 0.1180 | 3.74 | 0.1193 | 3.53 |
| 2.519 | 0.1494 | 5.06 | 0.1197 | 3.67 | 0.1210 | 3.47 |
| 2.770 | 0.1511 | 4.94 | 0.1210 | 3.61 | 0.1222 | 3.42 |
| 3.022 | 0.1525 | 4.84 | 0.1221 | 3.55 | 0.1232 | 3.37 |
| 3.273 | 0.1537 | 4.74 | 0.1231 | 3.50 | 0.1241 | 3.32 |
| 3.523 | 0.1548 | 4.65 | 0.1238 | 3.45 | 0.1247 | 3.28 |
| 3.775 | 0.1556 | 4.56 | 0.1243 | 3.40 | 0.1253 | 3.24 |
| 4.027 | 0.1566 | 4.48 | 0.1248 | 3.35 | 0.1256 | 3.20 |
| 4.279 | 0.1572 | 4.40 | 0.1253 | 3.31 | 0.1259 | 3.16 |
| 4.530 | 0.1579 | 4.33 | 0.1257 | 3.27 | 0.1263 | 3.12 |
| 4.782 | 0.1585 | 4.26 | 0.1261 | 3.24 | 0.1266 | 3.09 |
| 5.034 | 0.1590 | 4.20 | 0.1264 | 3.20 | 0.1268 | 3.06 |
| 5.289 | 0.1594 | 4.14 | 0.1267 | 3.16 | 0.1269 | 3.03 |
| 5.540 | 0.1599 | 4.08 | 0.1268 | 3.13 | 0.1271 | 3.00 |
| 6.043 | 0.1605 | 3.96 | 0.1272 | 3.07 | 0.1272 | 2.95 |
| 6.547 | 0.1610 | 3.86 | 0.1274 | 3.01 | 0.1273 | 2.90 |
| 7.050 | 0.1613 | 3.76 | 0.1276 | 2.95 | 0.1272 | 2.85 |
| 7.555 | 0.1616 | 3.67 | 0.1276 | 2.90 | 0.1271 | 2.80 |
| 8.063 | 0.1616 | 3.59 | 0.1275 | 2.85 | 0.1270 | 2.76 |
| 8.566 | 0.1617 | 3.51 | 0.1275 | 2.81 | 0.1269 | 2.72 |
| 9.069 | 0.1618 | 3.44 | 0.1273 | 2.76 | 0.1266 | 2.68 |
| 9.573 | 0.1616 | 3.36 | 0.1272 | 2.72 | 0.1264 | 2.64 |
| 10.076 | 0.1615 | 3.30 | 0.1270 | 2.68 | 0.1261 | 2.61 |
| 10.583 | 0.1613 | 3.23 | 0.1267 | 2.64 | 0.1259 | 2.57 |
| 11.086 | 0.1610 | 3.18 | 0.1265 | 2.61 | 0.1266 | 2.56 |
| 11.590 | 0.1608 | 3.12 | 0.1261 | 2.57 | 0.1253 | 2.51 |
| 12.093 | 0.1604 | 3.06 | 0.1259 | 2.54 | 0.1250 | 2.48 |
| 12.595 | 0.1600 | 3.01 | 0.1255 | 2.51 | 0.1248 | 2.45 |
| 13.098 | 0.1596 | 2.96 | 0.1252 | 2.47 | 0.1243 | 2.42 |
| 13.591 | 0.1590 | 2.92 | 0.1248 | 2.44 | 0.1239 | 2.40 |

TABLE 11

Results of strain sweep testing @ 60° C., Examples 53-55

| Strain | 53 | | 54 | | 55 | |
|---|---|---|---|---|---|---|
| (%) | tan δ | G' (MPa) | tan δ | G' (MPa) | tan δ | G' (MPa) |
| 0.253 | 0.1081 | 3.38 | 0.0828 | 1.94 | 0.0799 | 2.05 |
| 0.504 | 0.1198 | 3.24 | 0.0834 | 1.93 | 0.0829 | 2.04 |
| 0.752 | 0.1293 | 3.11 | 0.0855 | 1.92 | 0.0841 | 2.03 |
| 1.001 | 0.1375 | 3.00 | 0.0865 | 1.91 | 0.0855 | 2.02 |
| 1.249 | 0.1435 | 2.91 | 0.0875 | 1.90 | 0.0869 | 2.01 |
| 1.497 | 0.1485 | 2.83 | 0.0881 | 1.89 | 0.0877 | 2.00 |
| 1.744 | 0.1525 | 2.77 | 0.0891 | 1.88 | 0.0885 | 1.99 |
| 1.992 | 0.1556 | 2.70 | 0.0895 | 1.87 | 0.0894 | 1.98 |
| 2.239 | 0.1583 | 2.65 | 0.0900 | 1.87 | 0.0900 | 1.97 |
| 2.486 | 0.1606 | 2.60 | 0.0904 | 1.86 | 0.0905 | 1.96 |
| 2.734 | 0.1624 | 2.56 | 0.0909 | 1.85 | 0.0910 | 1.95 |
| 2.981 | 0.1639 | 2.52 | 0.0912 | 1.85 | 0.0916 | 1.95 |
| 3.228 | 0.1650 | 2.48 | 0.0913 | 1.84 | 0.0917 | 1.94 |
| 3.470 | 0.1660 | 2.45 | 0.0916 | 1.83 | 0.0921 | 1.93 |
| 3.969 | 0.1673 | 2.39 | 0.0918 | 1.82 | 0.0923 | 1.92 |
| 4.216 | 0.1676 | 2.36 | 0.0918 | 1.82 | 0.0924 | 1.91 |
| 4.707 | 0.1682 | 2.31 | 0.0920 | 1.81 | 0.0925 | 1.90 |
| 5.207 | 0.1685 | 2.27 | 0.0919 | 1.80 | 0.0925 | 1.89 |
| 5.700 | 0.1685 | 2.23 | 0.0919 | 1.79 | 0.0924 | 1.89 |
| 6.191 | 0.1683 | 2.20 | 0.0918 | 1.79 | 0.0924 | 1.88 |
| 6.691 | 0.1680 | 2.16 | 0.0918 | 1.78 | 0.0922 | 1.87 |
| 7.182 | 0.1676 | 2.13 | 0.0917 | 1.77 | 0.0922 | 1.86 |
| 7.682 | 0.1671 | 2.11 | 0.0916 | 1.77 | 0.0921 | 1.86 |
| 8.172 | 0.1665 | 2.08 | 0.0915 | 1.76 | 0.0921 | 1.85 |
| 8.664 | 0.1660 | 2.06 | 0.0915 | 1.75 | 0.0919 | 1.84 |
| 9.164 | 0.1655 | 2.04 | 0.0914 | 1.75 | 0.0918 | 1.84 |
| 9.655 | 0.1649 | 2.02 | 0.0912 | 1.74 | 0.0917 | 1.83 |
| 10.155 | 0.1644 | 2.00 | 0.0910 | 1.74 | 0.0917 | 1.82 |
| 10.648 | 0.1638 | 1.98 | 0.0910 | 1.73 | 0.0915 | 1.82 |
| 11.140 | 0.1633 | 1.96 | 0.0909 | 1.73 | 0.0914 | 1.81 |
| 11.640 | 0.1628 | 1.95 | 0.0910 | 1.72 | 0.0914 | 1.81 |
| 12.131 | 0.1623 | 1.93 | 0.0907 | 1.72 | 0.0913 | 1.80 |
| 12.632 | 0.1618 | 1.92 | 0.0907 | 1.71 | 0.0912 | 1.80 |
| 13.124 | 0.1613 | 1.90 | 0.0907 | 1.71 | 0.0911 | 1.79 |
| 13.616 | 0.1608 | 1.89 | 0.0906 | 1.70 | 0.0912 | 1.78 |
| 14.115 | 0.1605 | 1.87 | 0.0905 | 1.70 | 0.0912 | 1.78 |
| 14.607 | 0.1599 | 1.86 | 0.0905 | 1.70 | 0.0911 | 1.77 |
| 15.107 | 0.1596 | 1.85 | 0.0905 | 1.69 | 0.0912 | 1.77 |

TABLE 12

Results of strain sweep testing @ 60° C., Examples 56-58

| Strain | 56 | | 57 | | 58 | |
|---|---|---|---|---|---|---|
| (%) | tan δ | G' (MPa) | tan δ | G' (MPa) | tan δ | G' (MPa) |
| 0.254 | 0.1050 | 1.86 | 0.0693 | 1.81 | 0.0603 | 1.45 |
| 0.507 | 0.1122 | 1.78 | 0.0706 | 1.80 | 0.0603 | 1.44 |
| 0.759 | 0.1173 | 1.71 | 0.0721 | 1.78 | 0.0609 | 1.44 |
| 1.012 | 0.1205 | 1.66 | 0.0736 | 1.76 | 0.0613 | 1.43 |
| 1.264 | 0.1229 | 1.62 | 0.0749 | 1.74 | 0.0619 | 1.43 |
| 1.517 | 0.1247 | 1.58 | 0.0762 | 1.73 | 0.0623 | 1.42 |
| 1.770 | 0.1260 | 1.55 | 0.0773 | 1.71 | 0.0626 | 1.42 |
| 2.021 | 0.1270 | 1.52 | 0.0782 | 1.70 | 0.0630 | 1.42 |
| 2.273 | 0.1278 | 1.50 | 0.0790 | 1.69 | 0.0632 | 1.41 |
| 2.526 | 0.1283 | 1.48 | 0.0798 | 1.67 | 0.0634 | 1.41 |
| 2.778 | 0.1288 | 1.46 | 0.0803 | 1.66 | 0.0636 | 1.40 |
| 3.030 | 0.1291 | 1.44 | 0.0808 | 1.65 | 0.0637 | 1.40 |
| 3.280 | 0.1293 | 1.42 | 0.0813 | 1.64 | 0.0639 | 1.40 |
| 3.528 | 0.1295 | 1.41 | 0.0817 | 1.63 | 0.0640 | 1.39 |
| 3.780 | 0.1297 | 1.40 | 0.0818 | 1.62 | 0.0640 | 1.39 |
| 4.028 | 0.1296 | 1.38 | 0.0820 | 1.61 | 0.0641 | 1.39 |
| 4.539 | 0.1297 | 1.36 | 0.0821 | 1.59 | 0.0642 | 1.38 |
| 5.042 | 0.1296 | 1.34 | 0.0821 | 1.58 | 0.0643 | 1.38 |
| 5.545 | 0.1295 | 1.32 | 0.0819 | 1.56 | 0.0643 | 1.37 |
| 6.046 | 0.1293 | 1.30 | 0.0816 | 1.55 | 0.0643 | 1.37 |
| 6.557 | 0.1291 | 1.29 | 0.0812 | 1.53 | 0.0643 | 1.36 |
| 7.059 | 0.1289 | 1.28 | 0.0808 | 1.52 | 0.0642 | 1.36 |
| 7.562 | 0.1287 | 1.26 | 0.0803 | 1.51 | 0.0642 | 1.35 |
| 8.060 | 0.1283 | 1.25 | 0.0797 | 1.50 | 0.0640 | 1.35 |
| 8.564 | 0.1281 | 1.24 | 0.0792 | 1.49 | 0.0639 | 1.35 |
| 9.074 | 0.1278 | 1.23 | 0.0785 | 1.48 | 0.0638 | 1.34 |
| 9.577 | 0.1275 | 1.22 | 0.0780 | 1.47 | 0.0638 | 1.34 |
| 10.079 | 0.1273 | 1.21 | 0.0775 | 1.47 | 0.0636 | 1.34 |
| 10.581 | 0.1270 | 1.20 | 0.0770 | 1.46 | 0.0637 | 1.33 |
| 11.093 | 0.1268 | 1.19 | 0.0765 | 1.45 | 0.0635 | 1.33 |
| 11.594 | 0.1266 | 1.19 | 0.0760 | 1.44 | 0.0634 | 1.32 |
| 12.097 | 0.1263 | 1.18 | 0.0755 | 1.44 | 0.0633 | 1.32 |
| 12.600 | 0.1261 | 1.17 | 0.0751 | 1.43 | 0.0622 | 1.32 |
| 13.109 | 0.1259 | 1.16 | 0.0747 | 1.43 | 0.0630 | 1.32 |
| 13.611 | 0.1257 | 1.16 | 0.0744 | 1.42 | 0.0629 | 1.31 |
| 14.112 | 0.1255 | 1.15 | 0.0740 | 1.42 | 0.0628 | 1.31 |
| 14.615 | 0.1254 | 1.15 | 0.0735 | 1.41 | 0.0628 | 1.31 |
| 15.118 | 0.1253 | 1.14 | 0.0732 | 1.40 | 0.0624 | 1.30 |

The data of Tables 7-12 indicate, inter alia, that vulcanizates employing styrene/butadiene interpolymers having terminal units derived from polyhydroxyaryl nitriles (i.e., the polymers of Examples 45-46) exhibit excellent interaction with a variety of fillers as evidenced by significant reductions in high temperature tan δ values and ΔG' (Payne effect), increases in tan δ at 0° C. and bound rubber, etc.

Examples 59-66

Styrene/Butadiene Copolymers Functionalized with Hydroxyaryl Hydrazones

To a $N_2$-purged reactor equipped with a stirrer was added 1.62 kg hexane, 0.41 kg styrene solution, and 2.45 kg butadiene solution (22.2% by wt. in hexane). The reactor was charged with 3.27 mL n-butyllithium solution, followed by 1.10 mL 2,2-bis(2'-tetrahydrofuryl)propane solution. The reactor jacket was heated to 50° C. and, after ~33 min., the batch temperature peaked at ~63.2° C. After an additional ~30 minutes, the polymer cement was transferred to glass bottles. One portion was terminated with isopropanol (Example 59, control), while another was reacted with a 1.0 M solution of 3-(TBDMSO)BA (from Ex. 12) in hexane; the sample bottles were agitated in a 50° C. bath for ~30 minutes. To the latter was added TBAF solution (~6:5 molar ratio relative to initiator) before agitation for another hour at room temperature; this comparative sample is designated as Example 60 below.

The foregoing polymerization was essentially repeated, using the following amounts of reactants and additives:

| | |
|---|---|
| hexane | 1.62 kg |
| styrene solution | 0.41 kg |
| butadiene solution (22.2%) | 2.45 kg |
| n-butyllithium | 3.10 mL |
| 2,2-bis(2'-tetrahydrofuryl)propane solution | 1.10 mL |

After ~35 minutes, the batch temperature peaked at ~62.5° C. After an additional ~30 minutes, a portion of the cement was isolated and reacted with a 1.0 M solution of 4-(TBDMSO)BAPH (from Example 14) in hexane, controlling the amount of piperidine so that, relative to amount of butyllithium initiator, the molar ratio was ~1:1; this bottle was agitated in a 50° C. bath for ~30 minutes. To half of this mixture was added TBAF solution (~6:5 molar ratio relative to initiator), and this sample (Example 62) was rotated in a 25° C. water bath for about an hour. The protected (not hydrolyzed with TBAF) version is designated as Example 61.

The foregoing polymerization again was essentially repeated, using the following amounts of reactants and additives:

| | |
|---|---|
| hexane | 1.62 kg |
| styrene solution | 0.41 kg |
| butadiene solution (22.2%) | 2.45 kg |
| n-butyllithium | 3.29 mL |
| 2,2-bis(2'-tetrahydrofuryl)propane solution | 1.10 mL |

After ~34 minutes, the batch temperature peaked at ~62.6° C. After an additional ~30 minutes, a portion of the cement was isolated and reacted with a 1.0 M solution of 3-(TBDMSO) BAPH (from Example 16) in hexane, controlling the amount of piperidine so that, relative to amount of butyllithium initiator, the molar ratio was ~1:1; this bottle was agitated in a 50° C. bath for ~30 minutes. To half of this mixture was added TBAF solution (~6:5 molar ratio relative to initiator), and this sample (Example 64) was rotated in a 25° C. water bath for about an hour. The protected (not hydrolyzed with TBAF) version is designated as Example 63.

The foregoing polymerization yet again was essentially repeated, using the following amounts of reactants and additives:

| | |
|---|---|
| hexane | 1.62 kg |
| styrene solution | 0.41 kg |
| butadiene solution (22.2%) | 2.45 kg |
| n-butyllithium | 3.27 mL |
| 2,2-bis(2'-tetrahydrofuryl)propane solution | 1.10 mL |

After ~34 minutes, the batch temperature peaked at ~62.5° C. After an additional ~30 minutes, a portion of the cement was isolated and reacted with a 1.0 M solution of 3,4-(TBDMSO) BAPH (from Example 17) in hexane, controlling the amount of piperidine so that, relative to amount of butyllithium initiator, the molar ratio was ~1:1; this bottle was agitated in a 50° C. bath for ~30 minutes. To half of this mixture was added TBAF solution (~6:5 molar ratio relative to initiator), and this sample (Example 66) was rotated in a 25° C. water bath for about an hour. The protected (not hydrolyzed with TBAF) version is designated as Example 65.

Examples 59-66 were quenched in isopropanol containing BHT and then drum dried. Properties of these polymers are summarized below in Table 13.

TABLE 13

| Properties of polymers from Examples 59-66 | | | | | | | | |
|---|---|---|---|---|---|---|---|---|
| | 59 | 60 | 61 | 62 | 63 | 64 | 65 | 66 |
| $M_n$ (kg/mol) | 127 | 126 | 135 | 135 | 125 | 125 | 126 | 129 |
| $M_w/M_n$ | 1.03 | 1.03 | 1.03 | 1.03 | 1.03 | 1.03 | 1.03 | 1.06 |
| $M_p$ (kg/mol) | 130 | 130 | 139 | 139 | 129 | 129 | 130 | 130 |
| $T_g$ (° C.) | −37.0 | −36.6 | −38.2 | −38.4 | −38.1 | −37.9 | −37.3 | −36.5 |
| coupling (%) | 1.40 | 0.74 | 0 | 0 | 0 | 0 | 0 | 5.47 |

Examples 67-82

Preparation and Testing of Vulcanizates

Using the formulations from Tables 1a and 1b above, vulcanizable elastomeric compounds containing reinforcing fillers were prepared from the polymers of Examples 59-66. Compounds were cured for ~15 minutes at 171° C. to provide vulcanizates 67-82, respectively.

Results of physical testing on the resulting vulcanizates are summarized below in Tables 14 and 15; for the "Temp. sweep" section, the top rows of data are from measurements at 0° C. while the bottom rows are from measurements at 60° C.

Detailed strain sweep test results (tan δ) also were collected. The general trend in the results was as follows:
carbon black: 67<68<<73≈69<70<71<<72<74
silica: 75≈76<81≈77<78≈79<80<<82

TABLE 14

| Compound and vulcanizate properties, Examples 67-74 (carbon black) | | | | | | | | |
|---|---|---|---|---|---|---|---|---|
| | 67 | 68 | 69 | 70 | 71 | 72 | 73 | 74 |
| synthetic polymer (example no.) | 59 | 60 | 61 | 62 | 63 | 64 | 65 | 66 |
| Bound rubber (%) | 11.3 | 12.7 | 26.1 | 25.3 | 25.4 | 28.4 | 23.0 | 27.4 |
| MDR2000 @ 171° C. (final) | | | | | | | | |
| ML (kg·cm) | 0.90 | 0.95 | 1.19 | 1.25 | 1.09 | 1.15 | 0.99 | 1.16 |
| MH (kg·cm) | 17.72 | 18.63 | 17.08 | 17.00 | 16.80 | 16.68 | 16.13 | 16.05 |
| $t_{90}$ (min) | 6.26 | 8.05 | 5.50 | 6.04 | 5.85 | 6.16 | 6.40 | 7.72 |

TABLE 14-continued

Compound and vulcanizate properties, Examples 67-74 (carbon black)

| | 67 | 68 | 69 | 70 | 71 | 72 | 73 | 74 |
|---|---|---|---|---|---|---|---|---|
| $ML_{1+4}$ @ 100° C. (final) | 20.9 | 22.7 | 36.6 | 36.9 | 32.3 | 36.7 | 30.5 | 40.3 |
| Dynatstat ™ tan δ @ 60° C. (final) | 0.2164 | 0.2080 | 0.1307 | 0.1279 | 0.1252 | 0.1094 | 0.1251 | 0.1044 |
| Tensile @ 23° C. (final, unaged) | | | | | | | | |
| $M_{50}$ (MPa) | 1.74 | 1.78 | 1.65 | 1.64 | 1.62 | 1.57 | 1.68 | 1.63 |
| $M_{300}$ (MPa) | 12.33 | 13.28 | 14.54 | 13.71 | 14.48 | 15.39 | 14.33 | 16.09 |
| $T_b$ (MPa) | 16.8 | 18.8 | 20.8 | 15.8 | 16.9 | 18.3 | 14.9 | 15.3 |
| $E_b$ (%) | 393 | 374 | 407 | 336 | 341 | 344 | 314 | 290 |
| Tensile @ 100° C. (final, unaged) | | | | | | | | |
| $M_{50}$ (MPa) | 1.47 | 1.46 | 1.44 | 1.42 | 1.37 | 1.32 | 1.41 | 1.40 |
| $M_{200}$ (MPa) | 6.76 | 7.11 | 7.75 | 7.38 | 7.28 | 7.40 | 7.01 | 7.59 |
| $T_b$ (MPa) | 7.5 | 8.9 | 8.2 | 7.5 | 8.2 | 8.8 | 10.0 | 10.1 |
| $E_b$ (%) | 219 | 241 | 214 | 204 | 218 | 225 | 261 | 244 |
| Strain sweep (60° C., 10 Hz, final) | | | | | | | | |
| G' @ 5% strain (MPa) | 2.905 | 2.924 | 2.289 | 2.299 | 2.223 | 2.097 | 2.165 | 2.152 |
| G" @ 5% strain (MPa) | 0.674 | 0.645 | 0.314 | 0.305 | 0.289 | 0.243 | 0.296 | 0.246 |
| tan δ | 0.2322 | 0.2206 | 0.1373 | 0.1325 | 0.1299 | 0.1159 | 0.1367 | 0.1143 |
| ΔG' (MPa) | 3.651 | 3.467 | 1.000 | 0.944 | 0.835 | 0.629 | 0.796 | 0.632 |
| Temp. sweep (2% strain, 10 Hz, final) | | | | | | | | |
| G' (MPa) | 15.733 | 15.995 | 11.745 | 11.661 | 10.992 | 10.027 | 11.673 | 9.995 |
| | 6.010 | 6.070 | 4.757 | 4.643 | 4.382 | 4.167 | 4.419 | 4.197 |
| G" (MPa) | 6.021 | 6.063 | 4.268 | 4.248 | 4.102 | 3.682 | 4.398 | 3.901 |
| | 1.249 | 1.221 | 0.758 | 0.717 | 0.646 | 0.536 | 0.716 | 0.543 |
| tan δ | 0.3803 | 0.3760 | 0.3608 | 0.3614 | 0.3694 | 0.3636 | 0.3736 | 0.3861 |
| | 0.2078 | 0.2012 | 0.1594 | 0.1543 | 0.1475 | 0.1286 | 0.1621 | 0.1292 |
| Peak tan δ (° C.) | 0.77 | 0.78 | 0.85 | 0.85 | 0.88 | 0.92 | 0.86 | 0.92 |

TABLE 15

Compound and vulcanizate properties, Examples 75-82 (silica)

| | 75 | 76 | 77 | 78 | 79 | 80 | 81 | 82 |
|---|---|---|---|---|---|---|---|---|
| synthetic polymer (example no.) | 59 | 60 | 61 | 62 | 63 | 64 | 65 | 66 |
| Bound rubber (%) | 19.8 | 27.8 | 26.7 | 26.0 | 24.9 | 22.6 | 27.5 | 35.8 |
| MDR2000 @ 171° C. (final) | | | | | | | | |
| ML (kg · cm) | 2.40 | 1.86 | 2.46 | 2.01 | 1.90 | 1.88 | 1.60 | 1.54 |
| MH (kg · cm) | 26.59 | 24.74 | 25.05 | 24.16 | 23.46 | 23.17 | 22.44 | 20.41 |
| $t_{90}$ (min) | 8.74 | 5.80 | 6.57 | 5.82 | 5.69 | 4.72 | 5.23 | 4.58 |
| $ML_{1+4}$ @ 100° C. (final) | 19.9 | 22.1 | 31.2 | 27.0 | 27.0 | 29.1 | 24.3 | 32.1 |
| Dynatstat ™ tan δ @ 60° C. (final) | 0.1121 | 0.1114 | 0.1014 | 0.1005 | 0.0987 | 0.0878 | 0.1032 | 0.0727 |
| Tensile @ 23° C. (final, unaged) | | | | | | | | |
| $M_{50}$ (MPa) | 1.90 | 1.82 | 1.76 | 1.75 | 1.67 | 1.75 | 1.90 | 1.84 |
| $M_{200}$ (MPa) | 7.62 | 8.12 | 7.54 | 7.45 | 7.22 | 7.92 | 8.25 | 8.99 |
| $T_b$ (MPa) | 11.4 | 12.3 | 12.8 | 10.2 | 11.3 | 12.1 | 12.2 | 13.5 |
| $E_b$ (%) | 274 | 271 | 292 | 251 | 275 | 270 | 266 | 266 |
| Tensile @ 100° C. (final, unaged) | | | | | | | | |
| $M_{50}$ (MPa) | 1.74 | 1.69 | 1.68 | 1.70 | 1.66 | 1.71 | 1.76 | 1.62 |
| $M_{100}$ (MPa) | 3.08 | 3.12 | 3.02 | 3.11 | 3.03 | 3.21 | 3.32 | 3.21 |
| $T_b$ (MPa) | 6.7 | 6.7 | 6.5 | 6.4 | 6.9 | 6.6 | 7.1 | 7.2 |
| $E_b$ (%) | 200 | 188 | 191 | 185 | 199 | 181 | 191 | 188 |
| Strain sweep (60° C., 10 Hz, final) | | | | | | | | |
| G' @ 5% strain (MPa) | 4.885 | 3.597 | 3.321 | 3.371 | 3.226 | 3.326 | 3.446 | 2.451 |
| G" @ 5% strain (MPa) | 0.687 | 0.529 | 0.451 | 0.424 | 0.405 | 0.388 | 0.477 | 0.223 |
| tan δ | 0.1406 | 0.1469 | 0.1358 | 0.1258 | 0.1256 | 0.1168 | 0.1383 | 0.0911 |
| ΔG' (MPa) | 5.401 | 3.544 | 2.846 | 2.714 | 2.498 | 2.399 | 3.071 | 0.866 |
| Temp. sweep (2% strain, 10 Hz, final) | | | | | | | | |
| G' (MPa) | 17.576 | 15.769 | 15.680 | 16.066 | 15.777 | 15.632 | 14.723 | 12.163 |
| | 9.479 | 8.751 | 8.902 | 8.602 | 8.657 | 8.453 | 7.617 | 6.436 |
| G" (MPa) | 4.823 | 4.826 | 4.493 | 4.524 | 4.420 | 4.590 | 4.321 | 3.833 |
| | 1.132 | 1.103 | 1.044 | 1.005 | 0.966 | 0.897 | 0.879 | 0.625 |
| tan δ | 0.2734 | 0.3050 | 0.2856 | 0.2806 | 0.2790 | 0.2927 | 0.2920 | 0.3134 |
| | 0.1194 | 0.1260 | 0.1173 | 0.1168 | 0.1115 | 0.1060 | 0.1153 | 0.0971 |
| Peak tan δ (° C.) | 0.73 | 0.73 | 0.72 | 0.72 | 0.73 | 0.73 | 0.74 | 0.79 |

The data from the foregoing tables show that hydrazine functional SBR interpolymers exhibit excellent interaction with carbon black filler in both protected and hydrolyzed forms, whereas only the latter exhibits excellent interaction with silica filler (as evidenced by decrease in high temperature tan δ, reduction in ΔG', increased low temperature tan δ, etc.).

Examples 83-87

Styrene/Butadiene Copolymers Functionalized with Hydroxyaryl Oximes

To a N$_2$-purged reactor equipped with a stirrer was added 1.69 kg hexane, 0.41 kg styrene solution, and 2.39 kg butadiene solution (22.8% by wt. in hexane). The reactor was charged with 2.90 mL n-butyllithium solution (1.70 M in hexane), followed by 1.10 mL 2,2-bis(2'-tetrahydrofuryl)propane solution. The reactor jacket was heated to 50° C. and, after ~33 minutes, the batch temperature peaked at ~62.2° C. After an additional ~30 minutes, the polymer cement (Example 83, control) was terminated with isopropanol and drum dried.

The foregoing procedure was repeated. After ~33 minutes, the batch temperature peaked at ~62.5° C. After an additional ~30 minutes, a solution of 1.0 M of 3,4-(TBDMSO)BOx(TBDMSO) (from Ex. 18) in hexane was added, controlling the amount of oxime so that, relative to amount of butyllithium initiator, the molar ratio was ~1:1; this bottle was agitated in a 50° C. bath for ~30 minutes. The polymer cement was removed from the reactor to dried glass bottles, with TBAF solution (~6:5 molar ratio relative to 3,4-(TBDMSO)BOx(TBDMSO)), and this sample (Example 85) was agitated at room temperature for about an hour. The protected (not hydrolyzed with TBAF) version is designated as Example 84. The contents of each bottle were dropped into isopropanol containing BHT and drum dried.

The foregoing polymerization was essentially repeated, using the following amounts of reactants and additives:

| | |
|---|---|
| hexane | 1.62 kg |
| styrene solution | 0.41 kg |
| butadiene solution (22.2%) | 2.45 kg |
| n-butyllithium | 3.10 mL |
| 2,2-bis(2'-tetrahydrofuryl)propane solution | 1.10 mL |

After ~33 minutes, the batch temperature peaked at ~63° C. After an additional ~30 minutes, a portion of the cement was isolated and reacted with a 1.0 M solution of 2-(TBDMSO)BOx-(TBDMSO) (from Ex. 19) in hexane, controlling the amount of oxime so that, relative to amount of butyllithium initiator, the molar ratio was ~1:1; this bottle was agitated in a 50° C. bath for ~30 minutes. To half of this mixture was added TBAF solution (~6:5 molar ratio relative to oxime), and this sample (Example 87) was agitated at room temperature for about an hour. The protected (not hydrolyzed with TBAF) version is designated as Example 86. The contents of each bottle were dropped into isopropanol containing BHT and drum dried.

Properties of these polymers are summarized below in Table 16.

TABLE 16

| Properties of polymers from Examples 83-87 | | | | | |
|---|---|---|---|---|---|
| | 83 | 84 | 85 | 86 | 87 |
| Mn (kg/mol) | 139 | 226 | 277 | 165 | 131 |
| $M_w/M_n$ | 1.06 | 1.13 | 1.28 | 2.20 | 3.58 |
| $M_p$ (kg/mol) | 146 | 279 | 285 | 297 | 294 |
| $T_g$ (° C.) | −33.9 | −33.6 | −32.8 | −34.4 | −34.9 |
| coupling (%) | 2.56 | 82.89 | 89.14 | 84.07 | 83.29 |

Examples 88-97

Preparation and Testing of Vulcanizates

Using the formulations from Tables 1a and 1b above, vulcanizable elastomeric compounds containing reinforcing fillers were prepared from the polymers of Examples 82-87. Compounds were cured for ~15 minutes at 171° C. to provide vulcanizates 88-92 (carbon black) and 93-97 (silica), respectively.

Results of physical testing on the resulting vulcanizates are summarized below in Tables 17 and 18; for the "Temp. sweep" section, the top rows of data are from measurements at 0° C. while the bottom rows are from measurements at 60° C.

Detailed strain sweep test results (tan δ) also were collected. The general trend in the results was as follows:
  carbon black: 88<<91<89≈90<92
  silica: 93<<94<96<97<<95

TABLE 17

| Compound and vulcanizate properties, Examples 88-92 (carbon black) | | | | | |
|---|---|---|---|---|---|
| | 88 | 89 | 90 | 91 | 92 |
| synthetic polymer (example no.) | 83 | 84 | 85 | 86 | 87 |
| Bound rubber (%) | 11.7 | 22.8 | 29.6 | 23.6 | 28.7 |
| MDR2000 @ 171° C. (final) | | | | | |
| ML (kg · cm) | 1.02 | 3.26 | 3.21 | 2.84 | 3.35 |
| MH (kg · cm) | 17.86 | 18.07 | 18.33 | 18.35 | 18.09 |
| $t_{90}$ (min) | 7.04 | 7.15 | 8.88 | 7.13 | 8.96 |
| ML$_{1+4}$ @ 130° C. (final) | 29.1 | 87.0 | 82.3 | 80.0 | 82.6 |
| Dynastat ™ tan δ @ 60° C. (final) | 0.2126 | 0.1359 | 0.1241 | 0.1370 | 0.1309 |
| Tensile @ 23° C. (final, unaged) | | | | | |
| $M_{50}$ (MPa) | 1.73 | 1.54 | 1.62 | 1.69 | 1.68 |
| $M_{200}$ (MPa) | 7.68 | 6.98 | 8.50 | 8.49 | 9.80 |
| $T_b$ (MPa) | 13.0 | 13.1 | 12.9 | 12.8 | 13.0 |
| $E_b$ (%) | 298 | 311 | 274 | 269 | 244 |

TABLE 17-continued

Compound and vulcanizate properties, Examples 88-92 (carbon black)

| | 88 | 89 | 90 | 91 | 92 |
|---|---|---|---|---|---|
| Tensile @ 100° C./ (final, unaged) | | | | | |
| $M_{50}$ (MPa) | 1.48 | 1.38 | 1.42 | 1.44 | 1.55 |
| $M_{100}$ (MPa) | 2.84 | 2.56 | 2.84 | 2.76 | 3.20 |
| $T_b$ (MPa) | 6.9 | 5.7 | 7.0 | 6.6 | 6.2 |
| $E_b$ (%) | 204 | 182 | 189 | 191 | 161 |
| Strain sweep (60° C., 10 Hz, final) | | | | | |
| G' @ 5% strain (MPa) | 3.104 | 2.425 | 2.555 | 2.463 | 2.407 |
| G" @ 5% strain (MPa) | 0.665 | 0.336 | 0.330 | 0.327 | 0.317 |
| tan δ | 0.2142 | 0.1384 | 0.1292 | 0.1329 | 0.1318 |
| ΔG' (MPa) | 3.88 | 1.32 | 1.24 | 1.38 | 1.31 |
| Temp. sweep (2% strain, 10 Hz, final) | | | | | |
| G' (MPa) | 17.080 | 11.179 | 13.805 | 13.769 | 11.289 |
| | 6.216 | 4.556 | 5.308 | 5.267 | 4.667 |
| G" (MPa) | 7.200 | 4.888 | 6.122 | 6.242 | 5.144 |
| | 1.319 | 0.644 | 0.869 | 0.833 | 0.585 |
| tan δ | 0.4195 | 0.4338 | 0.4401 | 0.4493 | 0.4530 |
| | 0.2122 | 0.1413 | 0.1636 | 0.1581 | 0.1252 |
| Peak tan δ (° C.) | 0.79 | 0.89 | 0.88 | 0.85 | 0.92 |

TABLE 18

Compound and vulcanizate properties, Examples 93-97 (carbon black)

| | 93 | 94 | 95 | 96 | 97 |
|---|---|---|---|---|---|
| synthetic polymer (example no.) | 83 | 84 | 85 | 86 | 87 |
| Bound rubber (%) | 18.6 | 27.2 | 32.3 | 25.9 | 34.2 |
| MDR2000 @ 171° C. (final) | | | | | |
| ML (kg · cm) | 1.66 | 3.80 | 3.54 | 3.72 | 3.45 |
| MH (kg · cm) | 23.38 | 24.55 | 22.92 | 24.83 | 22.58 |
| $t_{90}$ (min) | 5.23 | 4.75 | 3.98 | 4.88 | 3.65 |
| $ML_{1+4}$ @ 130° C. (final) | 22.5 | 69.0 | 66.4 | 64.7 | 59.1 |
| Dynatstat ™ tan δ @ 60° C. (final) | 0.1117 | 0.0885 | 0.0872 | 0.0919 | 0.0821 |
| Tensile @ 23° C. (final, unaged) | | | | | |
| $M_{50}$ (MPa) | 2.01 | 1.90 | 1.92 | 1.91 | 2.09 |
| $M_{200}$ (MPa) | 8.12 | 7.96 | 8.42 | 7.98 | 9.06 |
| $T_b$ (MPa) | 11.9 | 13.2 | 12.6 | 11.8 | 12.4 |
| $E_b$ (%) | 271 | 292 | 270 | 267 | 254 |
| Tensile @ 100° C. (final, unaged) | | | | | |
| $M_{50}$ (MPa) | 1.80 | 1.85 | 1.84 | 1.86 | 1.98 |
| $M_{100}$ (MPa) | 3.35 | 3.40 | 3.50 | 3.41 | 3.82 |
| $T_b$ (MPa) | 5.8 | 6.3 | 4.9 | 6.2 | 5.9 |
| $E_b$ (%) | 167 | 174 | 137 | 174 | 151 |
| Strain sweep (60° C., 10 Hz, final) | | | | | |
| G' @ 5% strain (MPa) | 4.303 | 3.895 | 3.651 | 4.168 | 3.537 |
| G" @ 5% strain (MPa) | 0.610 | 0.448 | 0.419 | 0.493 | 0.349 |
| tan δ | 0.1418 | 0.1151 | 0.1146 | 0.1182 | 0.0985 |
| ΔG' (MPa) | 4.854 | 3.388 | 3.046 | 3.848 | 2.333 |
| Temp. sweep (2% strain, 10 Hz, final) | | | | | |
| G' (MPa) | 13.760 | 13.582 | 12.551 | 13.276 | 11.675 |
| | 7.258 | 7.197 | 6.710 | 7.139 | 6.109 |
| G" (MPa) | 4.515 | 4.098 | 3.935 | 4.493 | 4.034 |
| | 0.896 | 0.716 | 0.635 | 0.734 | 0.547 |
| tan δ | 0.3272 | 0.3016 | 0.3126 | 0.3372 | 0.3446 |
| | 0.1234 | 0.0995 | 0.0946 | 0.1028 | 0.0895 |
| Peak tan δ (° C.) | 0.78 | 0.78 | 0.80 | 0.79 | 0.82 |

The data from the foregoing tables show that hydroxyaryl oxime functionalized SBR interpolymers exhibit excellent interaction with particulate fillers, particularly silica, as evidenced by decrease in high temperature tan δ, reduction in ΔG', increased low temperature tan δ, significant increases in bound rubber, etc.

Examples 98-103

Styrene/Butadiene Copolymers Functionalized with Hydroxyaryl Azines

To a $N_2$-purged reactor equipped with a stirrer was added 1.55 kg hexane, 0.41 kg styrene solution, and 2.52 kg butadiene solution (21.6% by wt. in hexane). The reactor was charged with 3.35 mL n-butyllithium solution, followed by 1.10 mL 2,2-bis(2'-tetrahydrofuryl)propane solution. The reactor jacket was heated to 50° C. and, after ~35 minutes, the batch temperature peaked at ~64.3° C. After an additional ~30 minutes, the polymer cement was transferred to glass bottles, one of which was terminated with isopropanol (Example 98, control) and the other reacted with 1.0 M DMI in toluene (Example 99, comparative). Each sample was dropped into isopropanol containing BHT and drum dried.

The foregoing polymerization was essentially repeated, using the following amounts of reactants and additives:

| | |
|---|---|
| hexane | 1.59 kg |
| styrene solution | 0.41 kg |
| butadiene solution (21.9%) | 2.49 kg |
| n-butyllithium | 3.50 mL |
| 2,2-bis(2'-tetrahydrofuryl)propane solution | 1.10 mL |

After ~34 minutes, the batch temperature peaked at ~62.3° C. After another ~30 minutes, a portion of the cement was isolated and reacted with a 1.0 M solution of 4-(TBDMSO)Az (from Example 22) in hexane, controlling the amount of azine so that, relative to amount of butyllithium initiator, the molar ratio was ~1:1; this bottle was agitated in a 50° C. bath for ~30 min. To half of this mixture was added TBAF solution (~6:5 molar ratio relative to azine), and this sample (Example 101) was agitated at room temperature for about an hour. The protected (not hydrolyzed with TBAF) version is designated as Example 100. The contents of each bottle were dropped into isopropanol containing BHT and drum dried.

The foregoing polymerization again was essentially repeated, using the following amounts of reactants and additives:

| | |
|---|---|
| hexane | 1.61 kg |
| styrene solution | 0.41 kg |
| butadiene solution (22.1%) | 2.46 kg |
| n-butyllithium | 3.51 mL |
| 2,2-bis(2'-tetrahydrofuryl)propane solution | 1.10 mL |

After ~33 minutes, the batch temperature peaked at ~63.7° C. After an additional ~30 min., a portion of the cement was isolated and reacted with a 1.0 M solution of 3,4-(TBDMSO)Az (from Example 20) in hexane, controlling the amount of azine so that, relative to amount of butyllithium initiator, the molar ratio was ~1:1; this bottle was agitated in a 50° C. bath for ~30 min. To half of this mixture was added TBAF solution (~6:5 molar ratio relative to azine), and this sample (Example 103) was agitated at room temperature for about an hour. The protected (not hydrolyzed with TBAF) version is designated as Example 102. The contents of each bottle were dropped into isopropanol containing BHT and drum dried.

Properties of these polymers are summarized below in Table 19.

TABLE 19

Properties of polymers from Examples 98-103

| | 98 | 99* | 100 | 101 | 102 | 103 |
|---|---|---|---|---|---|---|
| $M_n$ (kg/mol) | 123 | 64 | 160 | 127 | 149 | 135 |
| $M_w/M_n$ | 1.03 | 1.38 | 1.57 | 1.13 | 1.40 | 1.19 |
| $M_p$ (kg/mol) | 127 | 56 | 121 | 121 | 121 | 120 |
| $T_g$ (° C.) | −37.1 | −37.3 | −35.9 | −36.0 | −36.4 | −36.8 |
| coupling (%) | 0 | 65.78 | 45.13 | 15.91 | 37.9 | 25.5 |

*DMI functional polymers tend to interact with GPC column packing materials which affects the polymer's elution time, thereby distorting molecular weight results.

Examples 104-115

Preparation and Testing of Vulcanizates

Using the formulations from Tables 1a and 1b above, vulcanizable elastomeric compounds containing reinforcing fillers were prepared from the polymers of Examples 98-103. Compounds were cured for ~15 minutes at 171° C. to provide vulcanizates 104-109 (carbon black) and 110-115 (silica), respectively.

Results of physical testing on the resulting vulcanizates are summarized below in Tables 20 and 21; for the "Temp. sweep" section, the top rows of data are from measurements at 0° C. while the bottom rows are from measurements at 60° C.

Detailed strain sweep test results (tan δ) also were collected. The general trend in the results was as follows:
carbon black: 104<<108<106<107<105<109
silica: 110<114<<112<113<<111<<115

TABLE 20

Compound and vulcanizate properties, Examples 104-109 (carbon black)

| | 104 | 105 | 106 | 107 | 108 | 109 |
|---|---|---|---|---|---|---|
| synthetic polymer (example no.) | 98 | 99 | 100 | 101 | 102 | 103 |
| Bound rubber (%) | 3.50 | 24.83 | 30.81 | 24.12 | 28.38 | 30.27 |
| MDR2000 @ 171° C. (final) | | | | | | |
| ML (kg·cm) | 0.92 | 1.23 | 1.88 | 1.12 | 1.50 | 1.90 |
| MH (kg·cm) | 17.14 | 15.78 | 15.36 | 16.62 | 15.17 | 16.76 |
| $t_{90}$ (min) | 6.33 | 5.89 | 7.28 | 9.40 | 7.25 | 9.10 |
| $ML_{1+4}$ @ 130° C. (final) | 23.7 | 39.7 | 42.8 | 33.8 | 36.4 | 57.1 |
| Dynatstat ™ tan δ @ 60° C. (final) | 0.2120 | 0.1066 | 0.1536 | 0.1353 | 0.1543 | 0.919 |

TABLE 20-continued

Compound and vulcanizate properties, Examples 104-109 (carbon black)

|  | 104 | 105 | 106 | 107 | 108 | 109 |
|---|---|---|---|---|---|---|
| Tensile @ 23° C. (final, unaged) | | | | | | |
| $M_{50}$ (MPa) | 1.76 | 1.62 | 1.56 | 1.62 | 1.71 | 1.78 |
| $M_{200}$ (MPa) | 7.53 | 9.34 | 7.93 | 8.23 | 8.29 | 10.67 |
| $T_b$ (MPa) | 17.2 | 16.5 | 15.7 | 14.5 | 19.0 | 15.9 |
| $E_b$ (%) | 381 | 297 | 325 | 297 | 371 | 263 |
| Tensile @ 100° C. (final, unaged) | | | | | | |
| $M_{50}$ (MPa) | 1.32 | 1.31 | 1.24 | 1.35 | 1.31 | 1.50 |
| $M_{200}$ (MPa) | 2.60 | 2.77 | 6.65 | 7.10 | 6.90 | 8.94 |
| $T_b$ (MPa) | 7.9 | 7.8 | 8.8 | 8.5 | 8.8 | 8.9 |
| $E_b$ (%) | 235 | 196 | 243 | 226 | 239 | 200 |
| Strain sweep (60° C., 10 Hz, final) | | | | | | |
| G' @ 5% strain (MPa) | 3.035 | 2.034 | 2.368 | 2.324 | 2.243 | 2.123 |
| G" @ 5% strain (MPa) | 0.697 | 0.218 | 0.375 | 0.333 | 0.369 | 0.201 |
| tan δ | 0.2298 | 0.1072 | 0.1583 | 0.1431 | 0.1645 | 0.0945 |
| ΔG' (MPa) | 3.942 | 0.427 | 1.384 | 1.136 | 1.204 | 0.425 |
| Temp. sweep (2% strain, 10 Hz, final) | | | | | | |
| G' (MPa) | 16.244 | 7.970 | 10.079 | 11.177 | 11.373 | 8.200 |
|  | 5.837 | 3.340 | 4.093 | 4.606 | 4.376 | 3.721 |
| G" (MPa) | 6.287 | 3.312 | 3.864 | 4.059 | 4.582 | 3.205 |
|  | 1.282 | 0.370 | 0.691 | 0.778 | 0.722 | 0.374 |
| tan δ | 0.3868 | 0.4153 | 0.3830 | 0.3625 | 0.3996 | 0.3866 |
|  | 0.2196 | 0.1108 | 0.1689 | 0.1690 | 0.1649 | 0.1004 |
| Peak tan δ (° C.) | 0.77 | 1.00 | 0.88 | 0.87 | 0.86 | 0.98 |

TABLE 21

Compound and vulcanizate properties, Examples 110-115 (silica)

|  | 110 | 111 | 112 | 113 | 114 | 115 |
|---|---|---|---|---|---|---|
| synthetic polymer (example no.) | 98 | 99 | 100 | 101 | 102 | 103 |
| Bound rubber (%) | 16.88 | 16.35 | 35.63 | 30.94 | 35.88 | 41.10 |
| MDR2000 @ 171° C. (final) | | | | | | |
| ML (kg · cm) | 0.92 | 1.23 | 2.46 | 2.01 | 1.90 | 1.88 |
| MH (kg · cm) | 17.14 | 15.78 | 25.05 | 24.16 | 23.46 | 23.17 |
| $t_{90}$ (min) | 6.33 | 5.89 | 6.57 | 5.82 | 5.69 | 4.72 |
| $ML_{1+4}$ @ 130° C. (final) | 19.0 | 40.0 | 40.5 | 28.6 | 33.8 | 40.2 |
| Dynatstat ™ tan δ @ 60° C. (final) | 0.1130 | 0.0823 | 0.1036 | 0.1044 | 0.1128 | 0.0688 |
| Tensile @ 23° C. (final, unaged) | | | | | | |
| $M_{50}$ (MPa) | 1.93 | 1.90 | 2.03 | 1.95 | 1.84 | 1.85 |
| $M_{200}$ (MPa) | 7.70 | 8.59 | 8.57 | 8.34 | 8.07 | 9.83 |
| $T_b$ (MPa) | 13.4 | 13.2 | 12.5 | 12.8 | 13.1 | 12.3 |
| $E_b$ (%) | 309 | 277 | 249 | 274 | 275 | 233 |
| Tensile @ 100° C. (final, unaged) | | | | | | |
| $M_{50}$ (MPa) | 2.03 | 1.96 | 1.80 | 1.82 | 1.62 | 1.72 |
| $M_{100}$ (MPa) | 3.68 | 3.74 | 3.48 | 3.52 | 3.06 | 3.53 |
| $T_b$ (MPa) | 7.2 | 6.8 | 6.5 | 6.0 | 6.6 | 6.7 |
| $E_b$ (%) | 187 | 167 | 178 | 164 | 189 | 163 |
| Strain sweep (60° C., 10 Hz, final) | | | | | | |
| G' @ 5% strain (MPa) | 4.598 | 3.299 | 3.995 | 3.708 | 3.510 | 2.486 |
| G" @ 5% strain (MPa) | 0.668 | 0.341 | 0.509 | 0.451 | 0.505 | 0.198 |
| tan δ | 0.1452 | 0.1032 | 0.1274 | 0.1216 | 0.1440 | 0.0796 |
| ΔG' (MPa) | 5.112 | 1.912 | 3.125 | 2.674 | 3.248 | 0.799 |
| Temp. sweep (2% strain, 10 Hz, final) | | | | | | |
| G' (MPa) | 14.957 | 12.059 | 14.442 | 14.485 | 13.959 | 10.465 |
|  | 7.969 | 6.705 | 7.084 | 7.179 | 7.343 | 5.568 |
| G" (MPa) | 4.326 | 3.818 | 4.761 | 4.773 | 4.238 | 3.486 |
|  | 0.965 | 0.701 | 0.805 | 0.824 | 0.873 | 0.470 |
| tan δ | 0.2876 | 0.3146 | 0.3269 | 0.3269 | 0.3023 | 0.3312 |
|  | 0.1210 | 0.1045 | 0.1135 | 0.1148 | 0.1189 | 0.0843 |
| Peak tan δ (° C.) | 0.75 | 0.79 | 0.76 | 0.76 | 0.75 | 0.82 |

The data from the foregoing tables show that hydroxyaryl azine functionalized SBR interpolymers exhibit excellent interaction with particulate fillers, particularly silica, as evidenced by decrease in high temperature tan δ, reduction in ΔG', increased low temperature tan δ, significant increases in bound rubber, etc. Additionally, these functionalized interpolymers display improved resistance to cold flow relative to an equivalent DMI-functionalized interpolymer.

Examples 116-123

Styrene/Butadiene Copolymers Functionalized with Hydroxyaryl Imines

To a $N_2$-purged reactor equipped with a stirrer was added 3.81 kg hexane, 1.10 kg styrene solution (34.5% by wt. in hexane), and 7.74 kg butadiene solution (19.7% by wt. in hexane). The reactor was charged with ~9.5 mL n-butyllithium solution (1.67 M in hexane), followed by ~3.5 mL 2,2-bis(2'-tetrahydrofuryl)propane solution. The reactor jacket was heated to 50° C. and, after the batch temperature peaked at ~62° C., the polymerization was allowed to proceed for an additional ~60 min. After the polymer cement was cooled to room temperature, samples were transferred to glass bottles, which were processed as follows:

Example 116—dropped into isopropanol containing BHT.
Example 117—1.0 M solution of 3,4-(BTBSO) PhCH=NPr (from Example 23) in hexane added, controlling the amount of imine so that its molar ratio, relative to amount of butyllithium initiator, was ~1:1.
Example 118—1.0 M solution of 3,5-(BTBSO) PhCH=NPr (from Example 24) in hexane added, controlling the amount of imine so that its molar ratio, relative to amount of butyllithium initiator, was ~1:1.
Example 119—1.0 M solution of 2,4-(BTBSO) PhCH=NPr (from Example 25) in hexane added, controlling the amount of imine so that its molar ratio, relative to amount of butyllithium initiator, was ~1:1.
Example 120—1.0 M solution of 2,3-(BTBSO) PhCH=NPr (from Example 26) in hexane added, controlling the amount of imine so that its molar ratio, relative to amount of butyllithium initiator, was ~1:1.
Example 121—1.0 M solution of 2,5-(BTBSO) PhCH=NPr (from Example 27) in hexane added, controlling the amount of imine so that its molar ratio, relative to amount of butyllithium initiator, was ~1:1.
Example 122—1.0 M solution of 2,4,5-(BTBSO) PhCH=NPr (from Example 28) in hexane added, controlling the amount of imine so that its molar ratio, relative to amount of butyllithium initiator, was ~1:1.
Example 123—1.0 M solution of 3,4,5-(BTBSO) PhCH=NPr (from Example 29) in hexane added, controlling the amount of imine so that its molar ratio, relative to amount of butyllithium initiator, was ~1:1.

Each of the bottles of Examples 117-123 was agitated at 50° C. for ~30 minutes before TBAF solution was added (~5:2 molar ratio relative to initiator) and then rotated in a 25° C. water bath for ~2 hours before being coagulated in isopropanol containing BHT.

Each of the polymer cements from Examples 116-123 was drum dried. The properties of these polymers are provided below in Table 22, where 1,2-microstructure percentages are based on total amount of butadiene employed.

As can be seen from a comparison of the cold flow test results, styrene/butadiene interpolymers functionalized by reaction with polyhydroxyaryl imine compounds exhibit significantly improved resistance to cold flow relative to an essentially identical SBR without such terminal functionalization.

TABLE 22

Properties of polymers from Examples 116-123

| | 116 | 117 | 118 | 119 | 120 | 121 | 122 | 123 |
|---|---|---|---|---|---|---|---|---|
| $M_n$ (kg/mol) | 122 | 131 | 131 | 136 | 126 | 168 | 161 | 148 |
| $M_w/M_n$ | 1.05 | 1.20 | 1.21 | 1.19 | 1.10 | 1.41 | 1.57 | 1.27 |
| $M_p$ (kg/mol) | 126 | 124 | 125 | 127 | 126 | 128 | 128 | 127 |
| Total styrene (%) | 20.4 | 20.4 | 20.4 | 20.4 | 20.4 | 20.4 | 20.4 | 20.4 |
| Blocked styrene (%) | 1.7 | 1.7 | 1.7 | 1.7 | 1.7 | 1.7 | 1.7 | 1.7 |
| 1,2-microstructure (%) | 58.9 | 58.9 | 58.9 | 58.9 | 58.9 | 58.9 | 58.9 | 58.9 |
| Cold flow (mm) | 2.32 | 3.67 | 4.48 | 3.23 | 2.66 | 4.04 | 4.34 | 3.65 |

Examples 124-139

Preparation and Testing of Vulcanizates

Using the formulations from Tables 1a and 1b above, vulcanizable elastomeric compounds containing reinforcing fillers were prepared from the polymers of Examples 116-123. Compounds were cured for ~15 minutes at 171° C. to provide vulcanizates 124-131 (carbon black) and 132-139 (silica), respectively.

Results of physical testing on the resulting vulcanizates are summarized below in Tables 23 and 24; for the "Temp. sweep" section, the top rows of data are from measurements at 0° C. while the bottom rows are from measurements at 60° C.

Detailed strain sweep test results (tan δ) also were collected. The general trend in the results was as follows:

carbon black: 124<<128<131≈127<126≈130<125≈129 silica: 132<<135<<139<136<134≈138<133≈137

TABLE 23

Compound and vulcanizate properties, Examples 124-131 (carbon black)

|  | 124 | 125 | 126 | 127 | 128 | 129 | 130 | 131 |
|---|---|---|---|---|---|---|---|---|
| synthetic polymer (example no.) | 116 | 117 | 118 | 119 | 120 | 121 | 122 | 123 |
| MDR2000 @ 171° C. (final) | | | | | | | | |
| ML (kg·cm) | 0.83 | 1.21 | 1.06 | 1.04 | 1.00 | 1.62 | 1.58 | 1.31 |
| MH (kg·cm) | 17.23 | 17.53 | 18.38 | 18.12 | 17.31 | 17.17 | 17.25 | 17.75 |
| $t_{50}$ (min) | 2.87 | 1.68 | 1.66 | 1.83 | 2.13 | 1.73 | 1.59 | 1.79 |
| $t_{90}$ (min) | 9.62 | 9.68 | 10.30 | 10.28 | 8.52 | 9.95 | 10.63 | 10.50 |
| $ML_{1+4}$ @ 130° C. (final) | 19.7 | 36.4 | 33.3 | 29.3 | 27.8 | 43.2 | 41.3 | 36.1 |
| Dynatstat™ tan δ @ 60° C. (final) | 0.2184 | 0.1165 | 0.1173 | 0.1400 | 0.1552 | 0.1136 | 0.1165 | 0.1384 |
| Tensile @ 23° C. (final, unaged) | | | | | | | | |
| $M_{50}$ (MPa) | 1.23 | 1.06 | 1.12 | 1.15 | 1.16 | 1.06 | 1.08 | 1.14 |
| $M_{300}$ (MPa) | 5.85 | 6.54 | 7.07 | 6.55 | 6.33 | 6.84 | 6.93 | 6.46 |
| $T_b$ (MPa) | 15.4 | 19.8 | 18.5 | 15.8 | 18.6 | 18.0 | 16.4 | 16.6 |
| $E_b$ (%) | 672 | 672 | 609 | 576 | 698 | 599 | 554 | 610 |
| Tensile @ 100° C. (final, unaged) | | | | | | | | |
| $M_{50}$ (MPa) | 0.88 | 0.90 | 0.99 | 0.98 | 0.86 | 0.91 | 0.90 | 0.92 |
| $M_{200}$ (MPa) | 3.10 | 3.55 | 3.87 | 3.74 | 3.32 | 3.73 | 3.65 | 3.60 |
| $T_b$ (MPa) | 7.4 | 8.5 | 8.7 | 8.6 | 7.7 | 7.7 | 7.5 | 9.2 |
| $E_b$ (%) | 417 | 388 | 372 | 392 | 389 | 344 | 346 | 422 |
| Strain sweep (60° C., 10 Hz, final) | | | | | | | | |
| G' @ 5% strain (MPa) | 2.92 | 2.15 | 2.22 | 2.24 | 2.32 | 2.19 | 2.17 | 2.31 |
| G" @ 5% strain (MPa) | 0.71 | 0.26 | 0.28 | 0.33 | 0.38 | 0.26 | 0.27 | 0.34 |
| tan δ | 0.2432 | 0.1193 | 0.1263 | 0.1475 | 0.1628 | 0.1208 | 0.1248 | 0.1487 |
| ΔG' (MPa) | 4.04 | 0.71 | 0.81 | 1.01 | 1.34 | 0.74 | 0.79 | 1.21 |
| Temp. sweep (2% strain, 10 Hz, final) | | | | | | | | |
| G' (MPa) | 16.45 | 10.10 | 10.69 | 11.95 | 13.04 | 9.63 | 8.93 | 12.15 |
|  | 5.19 | 3.59 | 3.82 | 4.13 | 4.38 | 3.45 | 3.31 | 4.14 |
| G" (MPa) | 7.57 | 5.09 | 5.30 | 5.81 | 6.20 | 4.97 | 4.59 | 5.87 |
|  | 1.22 | 0.54 | 0.60 | 0.76 | 0.88 | 0.48 | 0.42 | 0.76 |
| tan δ | 0.4591 | 0.5015 | 0.4939 | 0.4858 | 0.4739 | 0.5143 | 0.5133 | 0.4817 |
|  | 0.2351 | 0.1493 | 0.1574 | 0.1849 | 0.2007 | 0.1387 | 0.1276 | 0.1822 |

TABLE 24

Compound and vulcanizate properties, Examples 132-139 (silica)

|  | 132 | 133 | 134 | 135 | 136 | 137 | 138 | 139 |
|---|---|---|---|---|---|---|---|---|
| synthetic polymer (example no.) | 116 | 117 | 118 | 119 | 120 | 121 | 122 | 123 |
| MDR2000 @ 171° C. (final) | | | | | | | | |
| ML (kg·cm) | 1.51 | 1.38 | 1.55 | 1.54 | 1.36 | 2.07 | 1.97 | 1.94 |
| MH (kg·cm) | 23.82 | 21.78 | 23.44 | 23.82 | 22.90 | 23.43 | 23.23 | 24.39 |
| $t_{50}$ (min) | 2.68 | 2.24 | 2.32 | 2.43 | 2.40 | 2.26 | 2.35 | 2.34 |
| $t_{90}$ (min) | 8.02 | 6.42 | 7.15 | 6.71 | 6.61 | 6.30 | 7.07 | 6.35 |
| $ML_{1+4}$ @ 130° C. (final) | 17.3 | 30.7 | 29.8 | 24.0 | 26.0 | 37.6 | 35.6 | 31.9 |
| Dynatstat™ tan δ @ 60° C. (final) | 0.1249 | 0.0772 | 0.0809 | 0.1081 | 0.0919 | 0.0783 | 0.0807 | 0.0865 |
| Tensile @ 23° C. (final, unaged) | | | | | | | | |
| $M_{50}$ (MPa) | 1.81 | 1.61 | 1.82 | 1.84 | 1.77 | 1.75 | 1.78 | 1.96 |
| $M_{300}$ (MPa) | 9.28 | 11.27 | 11.49 | 10.96 | 10.97 | 11.54 | 11.37 | 11.44 |
| $T_b$ (MPa) | 12.4 | 14.8 | 13.7 | 14.5 | 15.0 | 13.9 | 14.7 | 14.3 |
| $E_b$ (%) | 355 | 412 | 373 | 376 | 386 | 347 | 368 | 355 |
| Tensile @ 100° C. (final, unaged) | | | | | | | | |
| $M_{50}$ (MPa) | 1.74 | 1.71 | 1.83 | 1.79 | 1.76 | 1.82 | 1.80 | 1.89 |
| $M_{200}$ (MPa) | 6.14 | 6.47 | 6.58 | 6.31 | 6.45 | 5.42 | 6.66 | 6.40 |
| $T_b$ (MPa) | 6.1 | 6.4 | 6.7 | 6.6 | 7.0 | 7.1 | 7.0 | 6.5 |
| $E_b$ (%) | 202 | 198 | 203 | 208 | 217 | 208 | 209 | 193 |
| Strain sweep (60° C., 10 Hz, final) | | | | | | | | |
| G' @ 5% strain (MPa) | 4.34 | 2.69 | 2.86 | 3.38 | 3.04 | 3.05 | 3.09 | 3.24 |
| G" @ 5% strain (MPa) | 0.66 | 0.26 | 0.29 | 0.45 | 0.33 | 0.29 | 0.31 | 0.36 |
| tan δ | 0.1532 | 0.0955 | 0.1000 | 0.1328 | 0.1081 | 0.0937 | 0.1013 | 0.1119 |
| ΔG' (MPa) | 4.65 | 1.03 | 1.26 | 2.65 | 1.58 | 1.27 | 1.44 | 1.88 |
| Temp. sweep (2% strain, 10 Hz, final) | | | | | | | | |
| G' (MPa) | 16.14 | 11.54 | 12.79 | 14.00 | 13.00 | 11.63 | 11.44 | 14.17 |
|  | 7.15 | 5.25 | 6.04 | 6.47 | 5.82 | 5.29 | 5.20 | 6.20 |

TABLE 24-continued

Compound and vulcanizate properties, Examples 132-139 (silica)

| | 132 | 133 | 134 | 135 | 136 | 137 | 138 | 139 |
|---|---|---|---|---|---|---|---|---|
| G" (MPa) | 6.31 | 5.27 | 5.53 | 5.85 | 5.63 | 5.38 | 5.23 | 6.02 |
| | 0.96 | 0.57 | 0.65 | 0.81 | 0.72 | 0.54 | 0.51 | 0.70 |
| tan δ | 0.3911 | 0.4566 | 0.4320 | 0.4176 | 0.4333 | 0.4624 | 0.4574 | 0.4250 |
| | 0.1342 | 0.1081 | 0.1070 | 0.1244 | 0.1229 | 0.1013 | 0.0982 | 0.1132 |

The data from the foregoing tables show that hydroxyaryl imine functionalized SBR interpolymers exhibit excellent interaction with particulate fillers, as evidenced by decrease in high temperature tan δ, reduction in ΔG', increased low temperature tan δ, etc.

Examples 140-141

Synthesis of cis-1,4-polybutadienes (unmodified)

Separate polymerizations were conducted to provide two control cis-1,4-polybutadienes. The amounts of reactants and catalyst components employed are summarized in the following table. (The concentrations of the butadiene solutions were 22.4% for Example 140 and 21.6% for Example 141, both by weight in hexane.)

TABLE 25

Amounts of materials employed in polymerizations

| | 140 | 141 |
|---|---|---|
| Monomer and solvent | | |
| hexane (kg) | 1.41 | 1.32 |
| 1,3-butadiene in hexane (kg) | 2.86 | 2.99 |
| Catalyst ingredients | | |
| 1.45M methylaluminoxane in toluene (mL) | 17.6 | 14.7 |
| 1,3-butadiene in hexane (g) | 3.6 | 3.2 |
| 0.537M neodymium versatate in cyclohexane (mL) | 0.48 | 0.40 |
| 1.0M diisobutylaluminum hydride in hexane (mL) | 5.37 | 4.48 |
| 1.0M diethylaluminum chloride in hexane (mL) | 1.02 | 0.85 |

The catalyst ingredients were combined in a purged 200 mL bottle and aged for ~15 minutes before being charged to a large reactor containing hexane and monomer. The reactor jacket was heated by 60° C. water.

After the polymerizations were allowed to proceed for ~60 min., the polymer cements were cooled to room temperature and dropped into isopropanol containing BHT.

Characteristics of the drum-dried polymers are summarized below in Table 27.

Examples 142-154

Synthesis of modified cis-1,4-polybutadienes

The polymerization process from Example 140 was repeated. After the polymer cement had cooled to room temperature, portions were transferred to purged bottles for separate functionalization reactions (with Example 142 providing a comparative):

- Ex. 142—0.5 M DEAB in toluene (0.6 mL/100 g cement)
- Ex. 143—1.0 M 2-TMSO-BN (Ex. 7) in hexane (0.3 mL/100 g cement)
- Ex. 144—1.0 M 3-TMSO-BN (Ex. 8) in hexane (0.3 mL/100 g cement)
- Ex. 145—1.0 M 4-TMSO-BN (Ex. 9) in hexane (0.3 mL/100 g cement)

Each functionalization reaction was carried out for ~30 minutes in a 65° C. bath before TBAF solution (1.0 M in THF, 1.5 mL/100 g polymer cement). Each polymer cement was poured into isopropanol containing BHT. Characteristics of these functionalized polymers are summarized below in Table 27.

The process from Examples 140-141 again was essentially repeated. The amounts of reactants and catalyst components employed are summarized in the following table. (The concentrations of the butadiene solutions were 22.2% by weight in hexane.)

TABLE 26

Amounts of materials employed in polymerization

| | Amounts |
|---|---|
| Monomer and solvent | |
| hexane (kg) | 1.35 |
| 1,3-butadiene in hexane (kg) | 2.88 |
| Catalyst ingredients | |
| 1.45M methylaluminoxane in toluene (mL) | 17.6 |
| 1,3-butadiene in hexane (g) | 3.2 |
| 0.537M neodymium versatate in cyclohexane (mL) | 0.48 |
| 1.0M diisobutylaluminum hydride in hexane (mL) | 4.97 |
| 1.0M diethylaluminum chloride in hexane (mL) | 0.96 |

After the polymerization was allowed to proceed for ~60 minutes, the polymer cement was cooled to room temperature before portions were transferred to purged bottles for separate functionalization reactions:

- Ex. 146—1.0 M 3,4-TMSO-BN (Ex. 5) in hexane (0.48 mL/100 g cement)
- Ex. 147—1.0 M 3,5-TMSO-BN (Ex. 6) in hexane (0.48 mL/100 g cement)

Each functionalization reaction was carried out similarly to those for Examples 142-145. Characteristics of these functionalized polymers are summarized below in Table 27.

TABLE 27

Properties of polymers from Examples 140-147

| | 140 | 141 | 142 | 143 | 144 | 145 | 146 | 147 |
|---|---|---|---|---|---|---|---|---|
| $M_n$ (kg/mol) | 120 | 141 | 122 | 82 | 114 | 116 | 107 | 116 |
| $M_w/M_n$ | 1.72 | 1.62 | 1.61 | 2.06 | 1.62 | 1.60 | 2.74 | 2.13 |

TABLE 27-continued

Properties of polymers from Examples 140-147

|  | 140 | 141 | 142 | 143 | 144 | 145 | 146 | 147 |
|---|---|---|---|---|---|---|---|---|
| $M_p$ | 163 | 204 | 165 | 160 | 165 | 164 | 147 | 148 |
| cis 1,4-linkage content (%) | 93.3 | 94.9 | 92.9 | 92.9 | 92.9 | 92.9 | 92.3 | 92.3 |
| trans 1,4-linkage content (%) | 6.1 | 4.5 | 6.5 | 6.5 | 6.5 | 6.5 | 7.1 | 7.1 |
| 1,2-linkage content (%) | 0.55 | 0.53 | 0.53 | 0.53 | 0.53 | 0.53 | 0.60 | 0.60 |
| gum Mooney, $ML_{1+4}$ @ 100° C. | 20.2 | 36.6 | 20.4 | 51.8 | 45.5 | 42.8 | 60.2 | 44.0 |
| Cold flow sample thickness (mm) | 1.58 | 1.99 | 1.57 | 2.50 | 2.41 | 2.46 | 3.28 | 3.19 |

The process from Examples 140-141 again was essentially repeated, employing 1.39 kg hexane and 2.84 kg 1,3-butadiene solution (22.5% by weight in hexane), and the catalyst composition was made using the same recipe as set forth above in Table 26. After the polymerization was allowed to proceed for ~60 minutes, the polymer cement was cooled to room temperature before portions were transferred to purged bottles for separate functionalization reactions (with each functionalizing agent-containing solution being 1.0 M in hexane and being added at a rate of 0.48 mL per 100 g polymer cement):

Ex. 148—3,4-(BTBSO)PhCH=NPr (Ex. 23)
Ex. 149—3,5-(BTBSO)PhCH=NPr (Ex. 24)
Ex. 150—2,4-(BTBSO)PhCH=NPr (Ex. 25)
Ex. 151—2,3-(BTBSO)PhCH=NPr (Ex. 26)
Ex. 152—2,5-(BTBSO)PhCH=NPr (Ex. 27)
Ex. 153—2,4,5-(TTBSO)PhCH=NPr (Ex. 28)
Ex. 154—3,4,5-(TTBSO)PhCH=NPr (Ex. 29)

Each functionalization reaction was carried out similarly to those for Examples 142-145. Characteristics of these functionalized polymers are summarized below in Table 28, in which "$t_{80}$" represents the time needed to reach a viscosity that is 80% greater than minimum.

TABLE 28

Properties of polymers from Examples 148-154

|  | 148 | 149 | 150 | 151 | 152 | 153 | 154 |
|---|---|---|---|---|---|---|---|
| $M_n$ (kg/mol) | 117 | 134 | 130 | 122 | 132 | 148 | 126 |
| $M_w/M_n$ | 1.66 | 2.33 | 2.20 | 1.87 | 2.13 | 2.35 | 1.89 |
| $M_p$ | 167 | 182 | 181 | 177 | 182 | 201 | 181 |
| cis 1,4-linkage content (%) | 93.6 | 93.6 | 93.6 | 93.6 | 93.6 | 93.6 | 93.6 |
| trans 1,4-linkage content (%) | 5.8 | 5.8 | 5.8 | 5.8 | 5.8 | 5.8 | 5.8 |
| 1,2-linkage content (%) | 0.59 | 0.59 | 0.59 | 0.59 | 0.59 | 0.59 | 0.59 |
| gum Mooney, $ML_{1+4}$ @ 100° C. | 30.5 | 45.6 | 28.0 | 25.6 | 28.1 | 41.8 | 23.1 |
| $t_{80}$ (minutes) | 1.97 | 2.37 | 1.96 | 1.66 | 1.79 | 2.25 | 1.89 |
| Cold flow sample thickness (mm) | 2.34 | 2.89 | 2.08 | 1.82 | 1.97 | 3.03 | 2.01 |

Examples 155-169

Preparation and Testing of Vulcanizates

Using the formulation set forth above in Table 1e, filled compounds were prepared from the polybutadienes of Examples 140-154 respectively. All compounds were cured for ~15 minutes at 171° C. to provide vulcanizates, The physical properties of the vulcanizates prepared from the compounds employing the polybutadienes from Examples 140-147 are compiled below in Table 29, while the physical properties of the vulcanizates prepared from the compounds employing the polybutadienes from Examples 148-154 are compiled in Table 30.

TABLE 29

Compound and vulcanizate properties, Examples 155-162

|  | 155 | 156 | 157 | 158 | 159 | 160 | 161 | 162 |
|---|---|---|---|---|---|---|---|---|
| synthetic polymer (example no.) | 140 | 141 | 142 | 143 | 144 | 145 | 146 | 147 |
| MDR2000 @ 145° C. (final) | | | | | | | | |
| ML (kg·cm) | 2.34 | 3.02 | 2.46 | 2.40 | 2.48 | 2.47 | 3.30 | 2.75 |
| MH (kg·cm) | 20.10 | 21.69 | 19.22 | 20.75 | 20.29 | 20.65 | 21.08 | 20.10 |
| $t_{50}$ (min) | 5.90 | 5.61 | 5.67 | 5.58 | 5.50 | 5.54 | 5.71 | 5.62 |
| $t_{90}$ (min) | 9.14 | 8.91 | 8.99 | 8.60 | 8.49 | 8.80 | 9.07 | 9.01 |
| $ML_{1+4}$ @ 130° C. (final) | 42.9 | 57.1 | 46.5 | 43.8 | 46.3 | 47.9 | 61.9 | 53.8 |
| $t_5$ (min) | 8.62 | 8.03 | 8.48 | 8.47 | 8.37 | 8.40 | 8.77 | 9.25 |
| Dynatstat ™ tan δ @ 50° C. (final) | 0.1348 | 0.1112 | 0.1076 | 0.1162 | 0.1093 | 0.1037 | 0.0884 | 0.0889 |
| Tensile @ 23° C. (final, unaged) | | | | | | | | |
| $M_{300}$ (MPa) | 9.58 | 10.10 | 10.44 | 10.07 | 10.28 | 10.71 | 9.56 | 10.62 |
| $T_b$ (MPa) | 12.07 | 13.26 | 13.80 | 13.03 | 12.93 | 13.57 | 14.69 | 12.37 |
| $E_b$ (%) | 358 | 369 | 369 | 365 | 358 | 358 | 412 | 335 |
| Tensile @ 100° C. (final, unaged) | | | | | | | | |
| $M_{200}$ (MPa) | 4.72 | 4.97 | 5.22 | 5.14 | 5.32 | 5.41 | 4.91 | 5.28 |
| $T_b$ (MPa) | 7.41 | 6.25 | 7.50 | 7.55 | 7.38 | 8.22 | 7.94 | 7.51 |
| $E_b$ (%) | 301 | 246 | 273 | 282 | 264 | 283 | 306 | 269 |
| Strain sweep (50° C., 15 Hz, final) | | | | | | | | |
| G' @ 3% strain (MPa) | 3.50 | 3.51 | 3.23 | 3.38 | 3.30 | 3.42 | 3.47 | 3.41 |
| ΔG' (MPa) | 3.19 | 2.94 | 2.40 | 2.71 | 2.44 | 2.50 | 2.24 | 2.26 |
| tan δ @ 3% strain | 0.1477 | 0.1311 | 0.1278 | 0.1352 | 0.1296 | 0.1253 | 0.1033 | 0.1089 |
| Δ tan δ | 0.0761 | 0.0677 | 0.0596 | 0.0654 | 0.0602 | 0.0566 | 0.0469 | 0.0468 |

TABLE 30

Compound and vulcanizate properties, Examples 163-169

|  | 163 | 164 | 165 | 166 | 167 | 168 | 169 |
|---|---|---|---|---|---|---|---|
| synthetic polymer (example no.) | 148 | 149 | 150 | 151 | 152 | 153 | 154 |
| MDR2000 @ 145° C. (final) | | | | | | | |
| ML (kg·cm) | 3.08 | 3.18 | 3.01 | 2.73 | 2.88 | 3.51 | 2.79 |
| MH (kg·cm) | 20.39 | 21.54 | 21.17 | 20.85 | 21.52 | 21.87 | 21.51 |
| $t_{50}$ (min) | 3.59 | 2.38 | 2.54 | 2.56 | 2.53 | 2.41 | 2.46 |
| $t_{90}$ (min) | 6.04 | 4.62 | 5.09 | 4.35 | 5.11 | 4.51 | 4.99 |
| $ML_{1+4}$ @ 130° C. (final) | 65.8 | 98.9 | 83.3 | 77.7 | 81.8 | 106.8 | 77.7 |
| $t_5$ (min) | 5.47 | 4.00 | 4.24 | 4.22 | 4.21 | 3.96 | 4.27 |
| Dynatstat ™ tan δ @ 50° C. (final) | 0.0915 | 0.1035 | 0.1134 | 0.1143 | 0.1128 | 0.1014 | 0.1112 |
| Tensile @ 23° C. (final, unaged) | | | | | | | |
| $M_{300}$ (MPa) | 10.42 | 11.20 | 11.11 | 10.84 | 10.40 | 11.78 | 9.73 |
| $T_b$ (MPa) | 13.89 | 13.68 | 13.67 | 11.93 | 12.57 | 12.58 | 12.90 |
| $E_b$ (%) | 371 | 352 | 353 | 325 | 349 | 319 | 374 |
| Tensile @ 100° C. (final, unaged) | | | | | | | |
| $M_{200}$ (MPa) | 5.12 | 5.50 | 5.56 | 5.27 | 5.09 | 6.05 | 4.85 |
| $T_b$ (MPa) | 6.59 | 6.15 | 6.76 | 6.76 | 5.75 | 6.63 | 6.23 |
| $E_b$ (%) | 250 | 222 | 240 | 252 | 225 | 220 | 251 |
| Strain sweep (50° C., 15 Hz, final) | | | | | | | |
| G' @ 3% strain (MPa) | 2.92 | 3.29 | 3.53 | 3.55 | 3.66 | 3.77 | 3.58 |
| ΔG' (MPa) | 1.54 | 2.11 | 2.56 | 2.73 | 2.92 | 2.77 | 2.76 |
| tan δ @ 3% strain | 0.1050 | 0.1156 | 0.1251 | 0.1252 | 0.1304 | 0.1159 | 0.1264 |
| Δ tan δ | 0.0443 | 0.0562 | 0.0612 | 0.0640 | 0.0678 | 0.0626 | 0.0657 |

That which is claimed is:

1. A process of providing a functionalized polymer comprising allowing a terminally active polymer to react with a compound comprising an aryl group that comprises at least one directly bonded $OG_p$ substituent, where $G_p$ is a protecting group selected from trihydrocarbylsilyl, benzyl, t-butyl, alkoxyalkyl, tetrahydropyranyl, allyl, sulfonamide, and pivalates, and a second type of substituent, said second type of substituent being free of active hydrogen atoms and being, or connecting to said aryl group through, a moiety that comprises a carbon-to-nitrogen multiple bond, said reaction of said compound with said polymer occurring through said second type of substituent, thereby providing said functionalized polymer.

2. The process of claim 1 wherein said terminally active polymer is provided from a solution that comprises an initiating compound and one or more types of ethylenically unsaturated monomers that comprises at least one type of polyene and optionally at least one type of vinyl aromatic compound, wherein said initiating compound is permitted to anionically initiate polymerization of said ethylenically unsaturated monomers.

3. The process of claim 2 wherein said one or more types of polyene comprises at least one type of conjugated diene.

4. The process of claim 1 wherein said terminally active polymer is provided by polymerizing one or more types of conjugated diene monomers in the presence of a catalytically effective amount of a catalyst composition comprising a lanthanide compound.

5. The process of claim 4 wherein said catalyst composition is prepared from one of the following combinations of ingredients:
  (a) a lanthanide compound, an alkylating agent and a halogen-containing compound,
  (b) a halogenated lanthanide compound and an alkylating agent,
  (c) a lanthanide compound and a halogenated alkylating agent,
  (d) a lanthanide compound and an aluminoxane; and
  (e) a lanthanide compound, an alkylating agent, and a non-coordinating anion or precursor thereof.

6. The process of claim 1 wherein $G_p$ is a trihydrocarbylsilyl group.

7. The process of claim 6 wherein each hydrocarbyl group is a linear or branched alkyl group.

8. The process of claim 1 wherein said aryl group is a phenyl group.

9. The process of claim 8 wherein said compound has the general formula

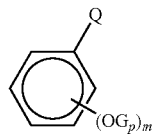

where
  Q is a substituent that is free of active hydrogen atoms and is, or connects to said phenyl group through, a moiety that comprises a carbon-to-nitrogen multiple bond,
  each $G_p$ independently is a protecting group selected from trihydrocarbylsilyl, benzyl, t-butyl, alkoxyalkyl, tetrahydropyranyl, allyl, sulfonamide, and pivalates, and
  m is an integer of from 1 to 5 inclusive.

10. The process of claim 9 wherein m is 2.

11. The process of claim 10 wherein said two $OG_p$ groups are on adjacent ring C atoms of said phenyl group.

12. The process of claim 9 wherein Q is a nitrile group.

13. The process of claim 9 wherein Q connects to said phenyl ring through a moiety that comprises a carbon-to-nitrogen double bond.

14. The process of claim 13 wherein Q is —CH=N—$OG_p$ where $G_p$ is a protecting group selected from trihydrocarbylsilyl, benzyl, t-butyl, alkoxyalkyl, tetrahydropyranyl, allyl, sulfonamide, and pivalates.

15. The process of claim 13 wherein Q is —CH=N—$R_N$ where $R_N$ is a cyclic group bonded to the N atom of said carbon-to-nitrogen double bond through a tertiary amino N atom.

16. The process of claim 13 wherein Q is —CH=NR' where R' is a hydrocarbyl moiety.

17. The process of claim 9 wherein Q is —CH=N—N=CHR$^1$ where R$^1$ is a substituted or unsubstituted hydrocarbyl group.

18. The process of claim 1 further comprising hydrolyzing said at least one directly bonded $OG_p$ substituent of said functionalized polymer.

19. The process of claim 18 further comprising isolating said functionalized polymer and blending said functionalized polymer with ingredients that comprise one or more types of particulate filler so as to provide a rubber compound.

20. The process of claim 19 further comprising vulcanizing said rubber compound.

* * * * *